United States Patent
Honda et al.

(10) Patent No.: US 7,305,135 B2
(45) Date of Patent: Dec. 4, 2007

(54) IMAGE CODING EQUIPMENT AND IMAGE CODING PROGRAM

(75) Inventors: Yoshimasa Honda, Kamakura (JP); Daisaku Komiya, Yokohama (JP); Tsutomu Uenoyama, Kawasaki (JP)

(73) Assignee: Matsushita Electric Industrial Co., Ltd., Kadoma-shi (JP)

( * ) Notice: Subject to any disclaimer, the term of this patent is extended or adjusted under 35 U.S.C. 154(b) by 506 days.

(21) Appl. No.: 10/108,241

(22) Filed: Mar. 26, 2002

(65) Prior Publication Data
US 2002/0172426 A1 Nov. 21, 2002

(30) Foreign Application Priority Data
Mar. 29, 2001 (JP) .............................. 2001-094838

(51) Int. Cl.
*G06K 9/38* (2006.01)
(52) U.S. Cl. ....................................... 382/236; 382/251
(58) Field of Classification Search ................ 382/162, 382/166, 232–253; 358/530, 539
See application file for complete search history.

(56) References Cited

U.S. PATENT DOCUMENTS

| | | | |
|---|---|---|---|
| 5,402,146 A | | 3/1995 | Rodriguez |
| 5,422,963 A | * | 6/1995 | Chen et al. ................ 382/232 |
| 6,094,631 A | * | 7/2000 | Li et al. ..................... 382/238 |
| 6,718,066 B1 | * | 4/2004 | Shen et al. ................. 382/243 |

FOREIGN PATENT DOCUMENTS

| | | |
|---|---|---|
| EP | 0863671 A1 | 9/1998 |
| GB | 2306832 A | 5/1997 |
| GB | 2350515 A | 11/2000 |
| JP | 6-30402 | 2/1994 |
| JP | 7-46553 | 2/1995 |
| JP | 11-146395 | 5/1999 |
| WO | WO 98/41021 | 9/1998 |
| WO | WO 00/18131 | 3/2000 |
| WO | WO 02/080568 A2 | 10/2002 |

OTHER PUBLICATIONS

Andrew T. Duchowski, Representing Multiple Regions of Interest with Wavelets, Proceedings of the Spie - The Int'l Society for Optical Engineering Spie-Int. Soc. Opt. Eng USA, vol. 3309, Jan. 28, 1998, pp. 975-986, XP008002443.

Ekaterina Barzykikna et al, Image Compression for Facial Photographs based on Wavelet Transform, Communications, Computers and Signal Processing, IEEE, Aug. 20, 1997, NYC, US, pp. 322-325.

* cited by examiner

*Primary Examiner*—Duy M. Dang
(74) *Attorney, Agent, or Firm*—Day Pitney LLP

(57) ABSTRACT

Image coding equipment wherein no sense of incongruity occurs when domains whose image quality should be improved are selected. To the domains selected with the domain selection section 111, the gradual coding parameter calculation section 112 computes the quantization values so that the quality of image may improve gradually toward the central part from the outside of the selected domain, and a picture is coded based on the value of such a parameter.

16 Claims, 15 Drawing Sheets

FIG. 3

302 A small block
303 A selected domain
301 A selection domain map

IMAGE CODING EQUIPMENT AND IMAGE CODING PROGRAM

BACKGROUND OF THE INVENTION

This application claims the benefit of Japanese patent application no. 2001-094838, filed Mar. 29, 2001, incorporated herein by reference.

The present invention relates to the image coding equipment and the image coding programs that code picture signals so that the coding result should not exceed restricted transmission bit rates, especially to such equipment and such programs that improve the quality of an image in specific domains without generating the sense of incongruity in the entire picture.

In recent years, it has become possible to transmit and receive picture signals through a transmission way or to store picture signals to storage media owing to the development of information communication technology and the maintenance of infrastructures.

In order to transmit picture signals through a transmission way with restricted transmission bit rates or to store picture signals to the storage media with restricted capacities the technology of picture signals, which carries out the compression coding of picture signals, is indispensable since the amount of information of picture signals is generally large.

There is MPEG (Moving Picture Expert Group) the standardization of which ISO/IEC is advancing as one of the compression coding methods of picture signals. This is the technology to transmit or store coded picture signals satisfying the bit rates of transmission ways or the capacities of storage media while cutting down the redundancy of information using time correlation and spatial correlation of picture signals.

In compression coding of picture signals, however, because picture signals are coded so that the coding result satisfy the restricted bit rate, the amount of code assigned to each frame is restricted and the quality of picture image becomes deteriorated. Especially when pictures in a screen are coded uniformly, the picture image quality becomes uniformly deteriorated.

Take for example, the case of a picture signal coding for a TV conference (a tele-conference). Though users want the quality of facial portion of the image to be better than that of the background portion, when the picture signals in a screen are uniformly coded the quality of the face portion, which is important, and that of the background portion, which is not important, become the same and the picture image after decoding does not satisfy the subjective quality of the image reflecting the intention of the users.

Then, the method that makes the quality of image of specific domains better than other domains is proposed as a technology in which picture signal coding is done reflecting the intention of users.

For example, in order to make the quality of image of specific domains better than others, changing coding parameters in the inside and outside of specific domains is proposed.

By the method indicated by ISO/IEC JTC1/SC29/WG11 MPEG 95/030, a domain (e.g., region) is chosen from a video image and the quality of image of a selected domain is made better than other domains by changing quantization values.

Moreover, with the picture transmission system and picture coding equipment which are indicated by laying open for public inspection JP 11-146395 A by the Commissioner of the Japan Patent Office (it is hereafter called the conventional example), the quality of image of a selected domain is made improved by the user's selection of a domain and by applying quantization matrices, which are prepared beforehand, to the selected domain.

However, if coding by simply using different coding parameters in the inside and the outside of a specific domain, a sense of incongruity will occur in the entire picture because the difference of the quality of the image between domains is large and the boundary of domains is conspicuous.

Below, the technique of the conventional example is explained.

FIG. 14 shows the block diagram of the conventional example.

In FIG. 14, the picture coding equipment (1401) is configured with the subtraction section (1408) which is connected to the image input section (1420), the DCT section (1402), the quantization section (1403), the VLC section (1404), the de-quantization section (1405), the inverse DCT section (1406), the addition section (1409), the frame memory (1407), the bit amount control section (1413) linked to the domain input section (1410), and the selection section (1412), quantization table buffer (1411), and is linked to the output section (1414).

The operation is explained below about the image coding equipment constituted as mentioned above.

The image input section (1420) outputs picture signals to the subtraction section (1408) for every frame.

The domain input section (1410) is a section that selects domains of the image quality that should be improved, and outputs the information on selected domains to the bit amount control section (1413). It may be case that one domain is selected and that its information is output to the bit control section.

Using the amount of generated codes on the previous frame being inputted from the VLC section (1404), the bit amount control section (1413) computes the amount of codes allocated to the inside and the outside of the selected domains of the present frame, and outputs it to the selection section (1412).

Based on the amount of codes allocated to the inside and the outside of the selected domains which the bit amount control section (1413) computed, the selection section (1412) selects the quantization tables on which two or more quantization matrices were recorded respectively corresponding to the inside and the outside of the selected domains, and inputs each selected quantization table into a quantization section.

The subtraction section (1408) subtracts the prediction picture inputted from a frame memory (1407) from the original picture image input from the image input section (1420), and outputs a prediction error to the DCT section (1402).

The DCT section (1402) applies DCT transformation on the prediction error input from the subtraction section (1408), and outputs the computed DCT coefficients to the quantization section (1403).

The quantization section (1403) quantizes using the quantization tables input from the selection part (1402) the DCT coefficients input from the DCT section (1402) and outputs the quantization tables and the quantized DCT coefficients to the inverse quantization section (1405) and the VLC section (1404).

The VLC section (1404) outputs the amount of generated codes to the bit amount control section (1413) while it carries out the variable length coding of the quantization tables inputted from the quantization section (1403), and the quantized DCT coefficients and outputs the variable length codes to the output part 1414.

The de-quantization section (1405) de-quantizes using the quantization tables input from the quantization section (1403) the quantized DCT coefficients, and outputs the de-quantized DCT coefficients to the inverse DCT section (1406).

The inverse DCT section (1406) applies the inverse DCT transformation to the de-quantized DCT coefficients input from the de-quantization section (1405), and outputs the decoded prediction error to the addition section (1409).

The addition section (1409) adds the prediction error input from the inverse DCT section (1406) and the decoded picture of the previous frame being input from the frame memory (1407), and computes the present decoded picture, and outputs it to the frame memory (1407).

The frame memory (1407) updates the internal buffer using the decoded pictures input from the addition section (1409), and outputs the decoded pictures to the subtraction section (1408) and the addition section (1409).

As mentioned above, the quality of image of selected domains can be improved by changing the quantization tables of the inside and the outside of the selected domains.

When the quality of images of selected domains is improved by using different quantization matrices for the selected domains and other domains as is done in the conventional example, block noises will arise because of the difference of quantization values, and the picture will give the sense of incongruity in the entire picture.

This is the same for other conventional technology such as coding pictures by using different quantization values thus generating a sense of incongruity in the entire picture.

SUMMARY OF THE INVENTION

The present invention aims to solve the problems of the conventional example mentioned above and aims to offer image coding equipment that codes picture signals so that the coding results satisfy the restricted transfer bit rates such that one can select domains of which one wants to improve the image quality without giving a sense of incongruity in the entire picture.

In order to attain the above-mentioned purpose, the present invention is characterized by the image coding equipment which codes picture signals having the domain selection section by which users can select the arbitrary domains in a picture and be able to change coding parameters to the selected domains. Thereby, users can select the domains in a picture to which the image quality should be improved.

Second, the present invention is characterized by having the automatic domain selection section that automatically selects the domains in a picture to which an improvement in the image quality is desirable and by being able to change the coding parameters of the selected domains. Thereby, users can let the equipment automatically select the domains in a picture to which an improvement to the image quality is desirable.

Third, the present invention is characterized by having a gradual coding parameter calculation section that computes the coding parameters, the values of which change gradually from the center of the selected domains toward the direction of their boundaries. Since the quality of image can be gradually changed from the inside of the selected domains and their boundaries by coding the selected domains using the computed gradual coding parameters, the quality of image in the selected domain is high, and the entire picture does not give the sense of incongruity and becomes a natural image.

Fourth, the present invention is characterized by the fact that the gradual coding parameter calculation section computes the quantization values that gradually change from the center of the selected domains to the direction of their boundaries. By coding the selected domains with gradually changing quantization values, the value of quantization errors can be gradually changed in the direction toward the selected domain boundaries from the center of the selected domains. Therefore no large block noises occur at the boundaries of the selected domains and the entire picture does not give the sense of incongruity and becomes a natural image.

Fifth, the present invention is characterized by the gradual coding parameter calculation section computing the values of frame rates gradually changing toward the selected domain boundaries from the center of a selection domain.

By coding the selected domains with gradually changing frame rate, the value of frame rates can be gradually changed in the direction toward the selected domain boundaries from the center of the selected domains. Therefore no large difference of frame rate occurs at the boundaries of the selected domains and the entire picture does not give the sense of incongruity and becomes a seamless picture.

Sixth, the present invention is characterized by the gradual coding parameter calculation section computing the characteristics of pre-filters gradually changing toward the direction of the selected domain boundaries from the center of the selected domains. By coding the selected domains with gradually changing pre-filter characteristics, the frequency characteristics can be gradually changed in the direction toward the selected domain boundaries from the center of the selected domains. Therefore no large difference of frequency characteristics occur at the boundaries of the selected domains and the entire picture does not give the sense of incongruity and becomes a natural image.

Seventh, the present invention is characterized by the gradual coding parameter calculation section computing frame skipping thresholds changing gradually toward the direction of the selected domain boundaries from the center of the selected domains. By coding the selected domains with gradually changing frame skipping thresholds, the frame skipping thresholds can be gradually changed in the direction toward the selected domain boundaries from the center of the selected domains. Therefore no large difference of frame skipping thresholds occur at the boundaries of the selected domains and the entire picture does not give the sense of incongruity and becomes a seamless picture.

Eighth, the present invention is characterized by the priority input section users can set priorities among the coding parameters of the selected domains and by the coding parameter calculation section such that values of coding parameters are changed following the priorities of the parameters so that the coding result satisfy the defined transfer bit rates. By coding the selected domains with parameter values calculated following the priorities users have set for the parameters, the improvement of the image quality is done according to the intention of the users.

Ninth, the present invention is characterized by the demand quality-of-image input section by which users can specify demand image quality, by the required bit rate calculation section which computes the transfer bit rates required in order to code picture signals at the specified demand image quality, and by outputting the necessary transmission bit rates. Thereby, users can grasp the relationship between the necessary bit rates and the image quality of coded pictures and can assign efficiently the bit rates for each picture signal by considering the image quality when one transmission way is used to transmit multiple coded picture signals.

Moreover, the present invention is characterized by an image coding program which codes picture signals executing the domain selection step at which users can select arbitrary domains in pictures and the coding parameter changing step at which the coding parameter values for the selected domains are changed to different values for the other domains, therefore the image coding program can change the coding parameters for the selected domains.

Thereby, making it possible for users to select domains in the pictures of which an improvement in the image quality is desired.

Second, the program of the present invention is characterized by executing the gradual coding parameter calculation step at which the coding parameter values are calculated so that they change gradually from the center of the selected domains toward the direction of their boundary. Since the quality of image can be gradually changed from the inside of the selected domains by using the gradually changing parameter values, the quality of image in the selected domains is high while no sense of incongruity on the entire picture occurs and the entire picture is natural.

Third, the program of the present invention is characterized by performing the image coding satisfying the defined transmission bit rates by executing the priority input step at which the priorities of coding parameters from the users are input and the coding parameter calculation step at which the values of coding parameters are changed following the priorities of the parameters. Thereby, the improvement of the image quality is done according to the intention of users by coding the selected domains with parameter values calculated following the priorities users have set for the parameters.

Fourth, the program of the present invention is characterized by outputting the necessary bit rates by executing the demand quality-of-image input step at which the specification of image quality from users are input and the necessary bit rate calculation step at which the necessary transmission bit rates are calculated for satisfying the specification of image quality.

Thereby, users grasp the relationship between the necessary bit rates and the image quality of coded pictures and can assign efficiently the bit rates for each picture signals by considering the image quality when one transmission way is used to transmit multiple coded picture signals.

BRIEF DESCRIPTION OF THE DRAWINGS

FIG. 3 illustrates a view showing an example of the selection domain map in which a selected domain is shown;

DETAILED DESCRIPTION

Figure 1:
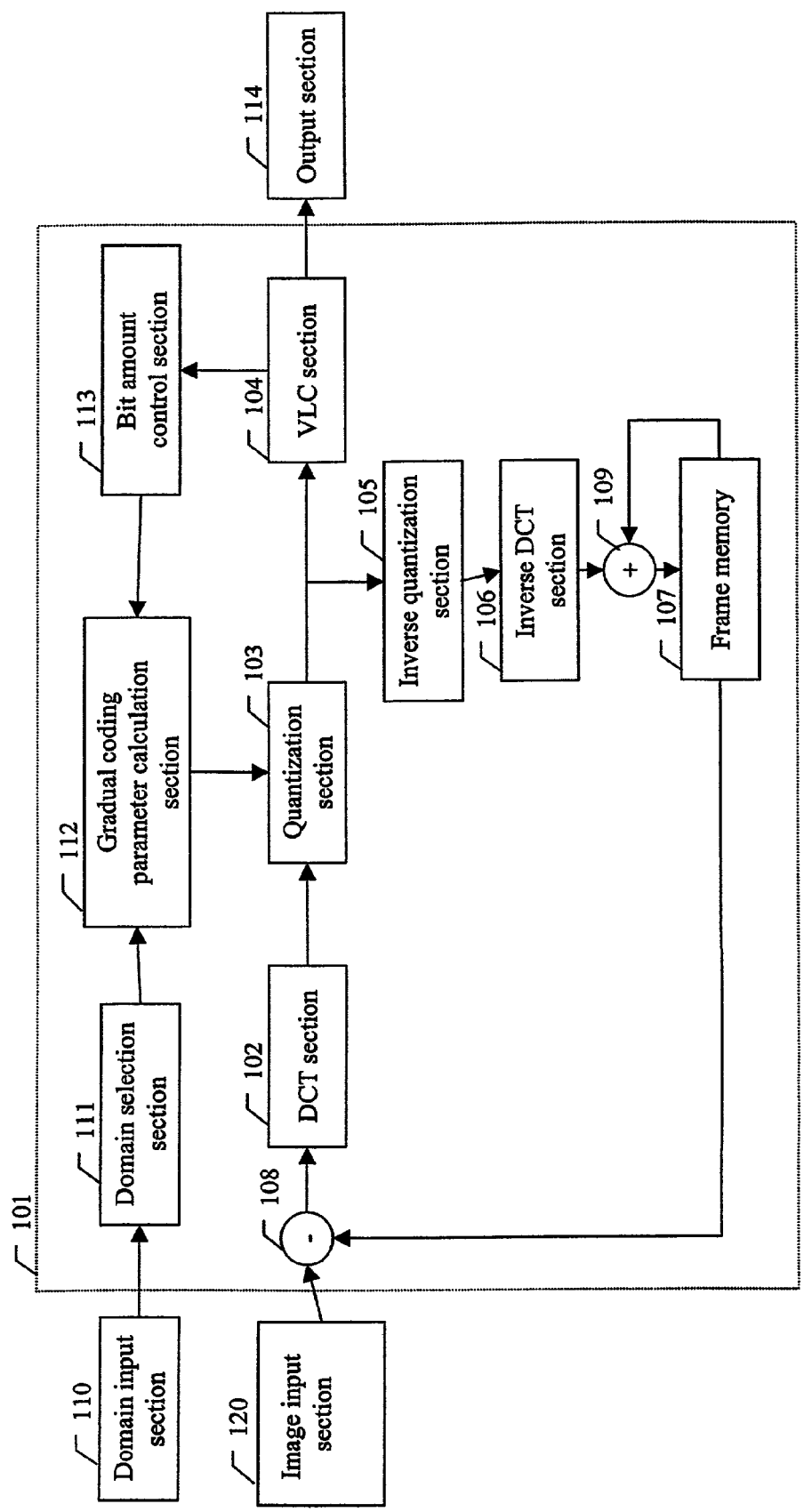
FIG. 1 illustrates a block diagram showing the composition of the image coding equipment in the first mode for carrying out the present invention.

A list of reference numbers in the figures is provided below.
101 coding equipment
102 DCT Section
103 quantization section
104 VLC Section
105 reverse quantization section
106 reverse DCT section
107 frame memory
108 subtraction section
109 addition section
110 domain input section
111 domain selection section
112 gradual coding parameter calculation section
113 The bit amount control section
114 output section
120 image input section
Modes for Carrying Out the Present Invention Hereafter, the modes for carrying out for the present invention are explained using from FIG. 1 to FIG. 13 and FIG. 15. In addition, this invention is not limited to the form of these modes at all, and can be carried out by the different modes that do not deviate from the essence of the described modes.

First Mode for Carrying out the Invention

The first mode for carrying out the present invention is an image coding equipment that codes picture signals and satisfies the determined transmission bit rates. Explained below is an image coding equipment characterized by offering a seamless image which does not give sense of incongruity on the entire picture and makes it possible to select arbitrary domains in pictures and making the image quality of the selected domains better than the other domains and changing the quantization values gradually from the center of the selected domains toward their boundaries. (Throughout the present invention, the number of selected domains is arbitrary. It may be the case that one domain is selected and that its image quality is made improved.)

The block diagram of the image coding equipment in the first mode for carrying out the present invention is shown in FIG. 1. In FIG. 1, the image coding equipment is configured with the subtraction section (108) which is connected to the image input section (120) and subtracts the picture signals, the DCT section (102) which applies the DCT transformations, the quantization section (103) which performs the quantization processing, the VLC section (104) which performs the variable length coding, the bit amount control section (113) which controls the amount of codes generated, the gradual coding parameter calculation section (112) which computes gradual quantization values, the inverse quantization section (105) which performs the inverse quantization processing, the inverse DCT section (106) which applies the inverse DCT transformations, the addition part (109) which performs the addition processing, the frame memory (107) which stores the decoded pictures, and the domain selection section (111) which is connected to the domain input section (110), where the VLC section (104) is connected to the output section (114).

Figure 2:
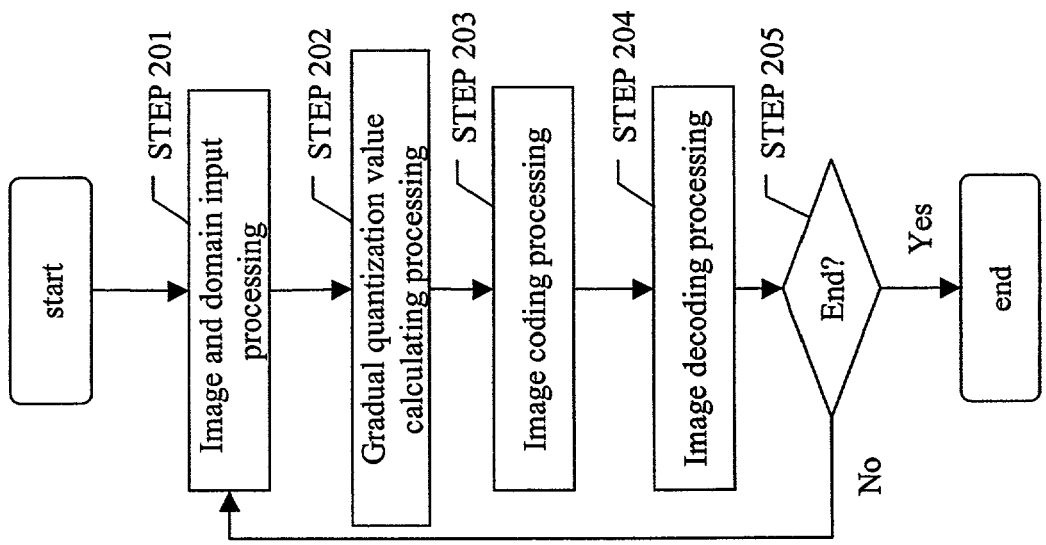
FIG. 2 illustrates a flow chart that shows the flow of image coding processing.

About the image equipment 101 configured as mentioned above, the rough flow of the processing is shown in FIG. 2, and the processing is explained below.

STEP201: The Image and Domain Input Processing

The image input section (120) detects synchronized signals contained in picture signals, and outputs a picture image that constitutes picture signals to the subtraction section (108) for every picture. The domain input section (110) is a section that inputs the domains (it is henceforth defined as selected domains) the quality of image that users want to improve in pictures, and outputs the information on the domains to the domain selection section (111). For example, when a user specifies a rectangular domain, the coordinates x at the upper left of the rectangular domain, y, and the width w of the rectangular domain and height h shall be inputted. The method for specifying the information on domains at the domain input section, however, is not limited to this, and any specification method can be used as long as it is a specification method of the information on the domain. Moreover, the method by which the specific object inside a picture can be recognized automatically and the range in which the subject has appeared can also be taken.

STEP202: The Gradual Quantization Value Calculation Processing

The domain selection section (111) creates selection domain maps using the information on a domain of coordinate and size (x y, w, h) input from the domain input section (110), and outputs the selection domain maps to the gradual coding parameter calculation section (112).

The gradual coding parameter calculation section (112) computes gradual quantization values using the selection domain maps input from the domain selection section (111) and the amount Bi of code of the picture i input from the bit amount control section (113) described below.

Calculation of gradual quantization values consists of three procedures, and is described in detail below.

The procedure of calculation of the bit amount to be allocated to the small blocks outside the selected domains By using the bit amount Bi allocated to the picture i, the bit amount $A_H$ to be allocated to the small blocks in the selected domains and the bit amount $A_L$ allocated to the small blocks outside the selected domains are computed by the formula 1.1 and the formula 1.2.

$$A_H = \frac{Bi}{N} * \alpha \qquad (1.1)$$

$$A_L = \frac{Bi - A_H * N_H}{N_L} \qquad (1.2)$$

where N is the number of small blocks in one frame, α is a constant for magnification of the code allocation, that is, a constant for magnification for increasing the bit amount allocated to the selected domains.

Moreover, in the formula 1.2, $N_H$ is the number of small blocks in the selected domains, and $N_L$ is the number of small blocks outside the selected domains.

The procedure of the gradual bit amount allocation to the small blocks in the selected domains Next, the gradual bit amount allocation to the small blocks in the selected domains is computed.

The large bit amount will be allocated to the small blocks of the central parts of the selected domains and the nearer to the boundaries of the selected domains the small block is the smaller bit amount allocated to the small block. Thereby, the image quality is improved gradually towards the center of the selected domains, and the image quality is deteriorated gradually towards the outside of the selected domains. Hence the difference of image quality of the inside and the outside of the selected domains at the boundaries of the selected domains can be made small.

FIG. 3 illustrates a view showing an example of the selection domain map 301 with small blocks 302, in which a selected domain 303 is shown. The selected domain 303 comprises a number of the small blocks 302, and forms a subset of the selection domain map 301.

Figure 4:
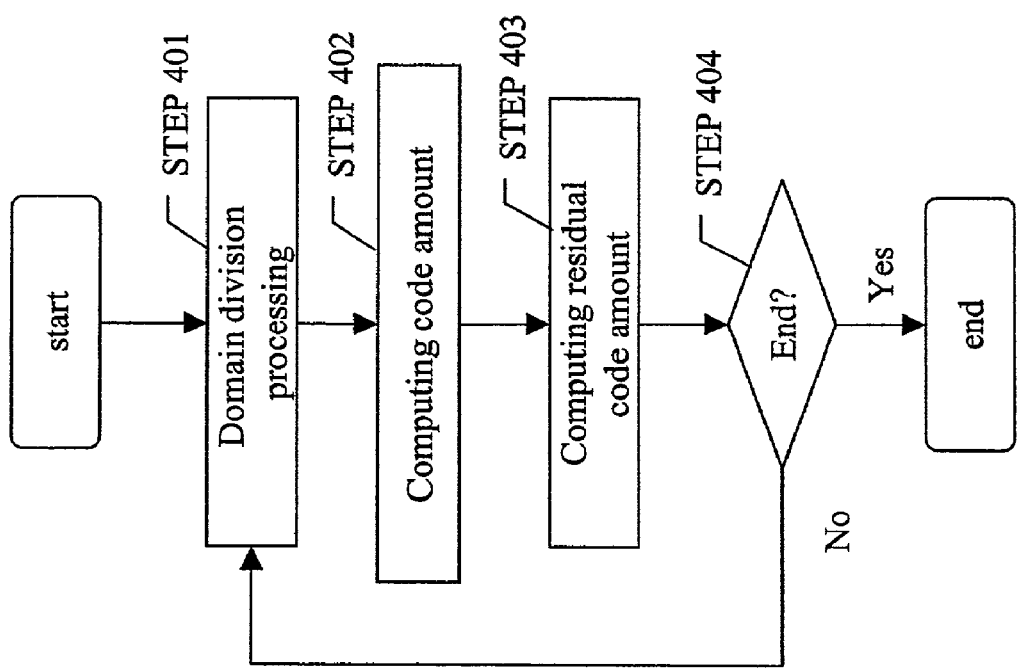
FIG. 4 illustrates a flow chart that shows the flow of the bit amount calculation processing allocated to the small block in the selected domain.

A flow chart about the procedure of the bit amount computing method to the small blocks in the selected domain is shown in FIG. 4.

The flow chart of FIG. 4 consists of STEP401: the domain division processing on the selected domains, STEP402: the processing for computing the bit amount allocated to the divided domains, STEP403: the processing for computing the residual bit amount after the bit amount allocation, and STEP404: the judgment of exiting the whole processing. Below, each STEP is explained in detail.

STEP401: Domain Division Processing

In this processing, the selected domains are divided and areas are obtained.

Each area will be divided from the exterior of the selected domains toward the central part as it performs the loop from STEP401 to STEP404.

Let G be the center of gravity of one selected domain, and let Block(j) denote the j-th small block in the selected domain. And let the Vj be the point at which the half-straight line extended from G to the center of Block(j) and the boundary of the selected domain cross (when there are two or more such points, the point nearest to G is used). Let β be the maximum number of divisions of the selected domain and N be the number of times that STEP401 is performed in the loop from STEP401 to STEP404. When the areas obtained are called the 1st, the 2nd, the 3rd, - - -, and the Nth area, Block (j) is defined to belong to the I-th area if and only if the center of Block(j) is in the I-th line segment from the point Vj where the line segments are obtained by dividing the line GVj into β lines of equal length. If the center of Block (j) is the boundary point of the line segments, Block(j) is defined to belong to the line segment near the point Vj. Below, the I-th area will be denoted ad Area-I.

STEP402: The processing for computing the bit amount allocated to the divided domains.

Next, the bit amount allocated to each area is computed so that the area near the center of the selected domain is allocated a large amount of code.

The increase value ΔB of the bit amount allocated for each area is shown as the formula 1.5. In the formula 1.5, γ is an increase parameter of the bit amount, which specifies the increase ratio of the allocated bit amount for the small blocks outside the selected areas, and $A_L$ is the bit amount allocated to the small blocks outside the selected domain.

$$\Delta B = A_L * \gamma \qquad (1.5)$$

The bit amount to be allocated to Area-i is computed using the increase value ΔB. The bit amount to be allocated to Area-i is shown in the formula 1.6. In the formula 1.6, $A_{Hi}$ is the bit amount allocated to the small block of Area-i.

$$A_{Hi} = A_L + \Delta B * i \qquad (1.6)$$

Specifically, as we approach to the center of the selected domain, the bit amount allocated to each area increases by ΔB.

STEP403: The Processing for Computing the Residual Bit Amount After Bit Amount Allocation After the bit amount allocated to Area-i is computed, the residual bit amount of the bit amount allocated to the selected domain is computed.

The computation of the residual bit amount $R_{Hi}$ is shown in the formula 1.7.

In the formula 1.7, $N_{Hj}$ is the number of the small blocks included in Area-j.

$$R_{Hi} = A_H * N_H - \sum_{j=1}^{i} A_{Hj} * N_{Hj} \qquad (1.7)$$

STEP404: The Judgment of Exiting the Whole Processing

The judgment of exiting the whole processing is performed using the residual bit amount computed according to the formula 1.7. The whole processing will be exited if the formula 1.8 is satisfied, and if not the execution returns to STEP401 and the processing is repeated again from STEP401. In the formula 1.8, i is the number of times that the STEP 401 is performed, and $N_{Hi+1}$ is the number of the small blocks included in the area i+1 obtained when STEP401 is performed next.

$$\frac{R_{Hi}}{\Delta B} \geq N_{Hi+1} \qquad (1.8)$$

That is, the judgment of exiting is done if there is any bit amount that can be allocated to areas to be generated when the next domain division is carried out.

Figure 5:
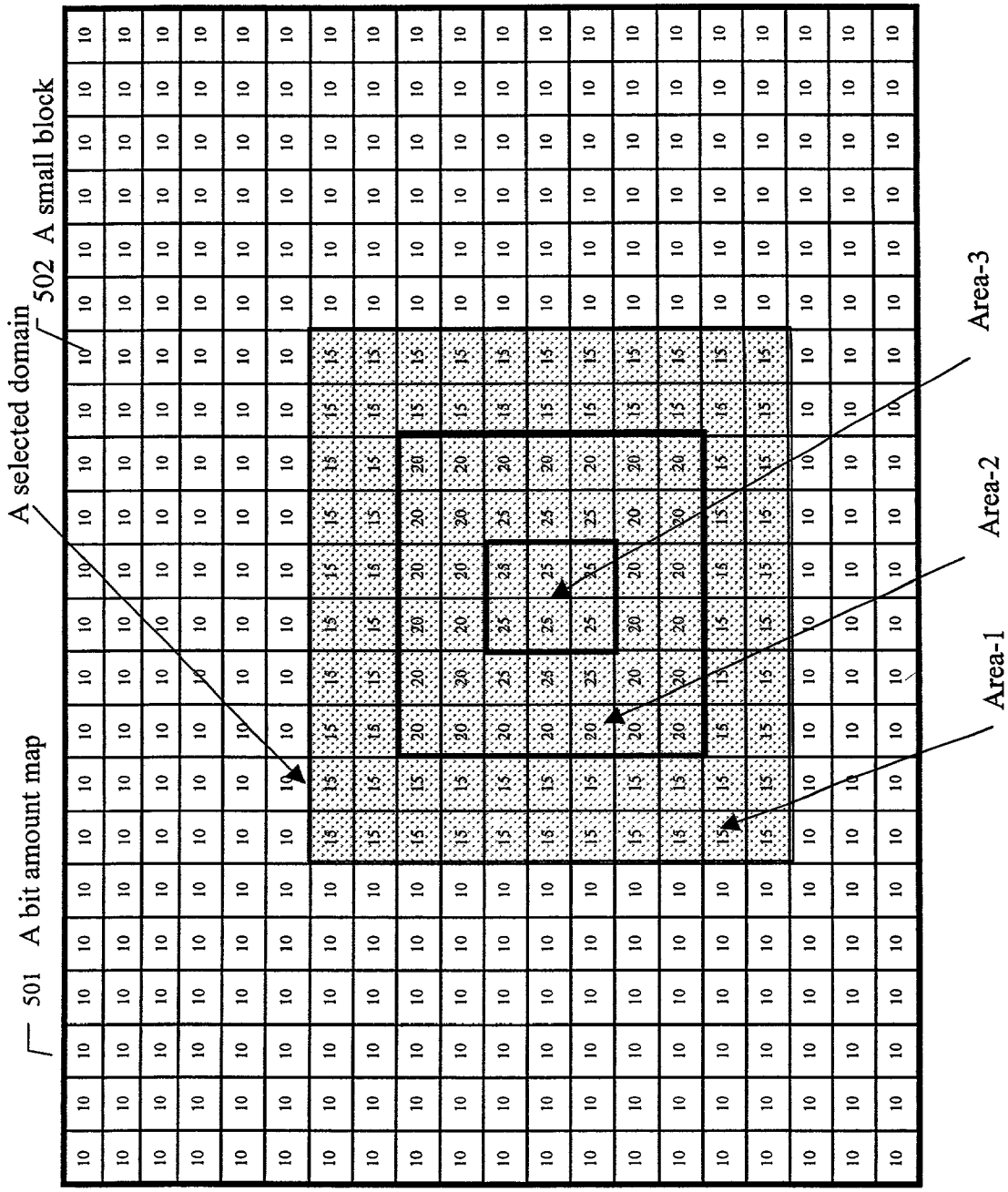
FIG. 5 illustrates a view showing an example of the bit amount map in which the bit amount of each small block is shown.

By repeating the processing of STEP401–404, the selected domain is divided into areas and the bit amount is allocated to each area in such a way that the bit amount gradually increases towards the center of the selected domain. An example of the allocation of the bit amount is shown in FIG. 5. In FIG. 5, figures written in a small block are the bit amount allocated to the small block. In the selected domain, the bit amount allocated to a small block is getting larger as the distance of the center of the selected domain and the small block is getting smaller.

The procedure of calculation of quantization values:

After determining the bit amount to all small blocks in a picture, the quantization value of each small block is computed according to the bit amount allocated to each small block. The quantization value is calculated based on the formula 1.9. In the formula 1.9, Qn is the quantization value of the small block n, An is the bit amount allocated to the small area n, and f(x) is a function which returns the quantization values for the bit amount x. The function f(x) has the property that the smaller the bit amount is the larger quantization value is returned by f(x). We assume that the function f(x) is determined beforehand.

$$Q_n = f(A_n) \qquad (1.9)$$

Figure 6:
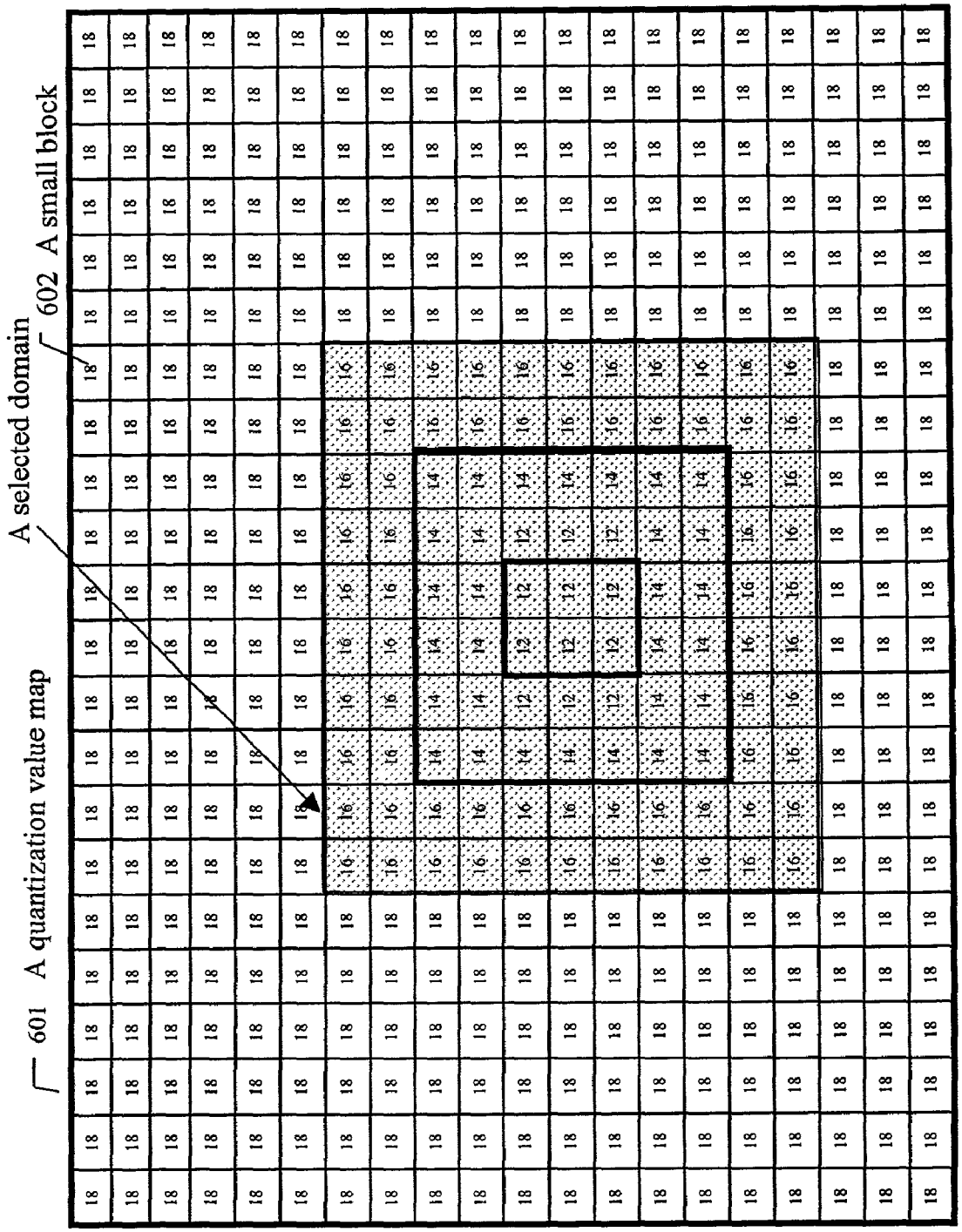
FIG. 6 illustrates a view showing an example of the quantization value map in which the quantization value of each small block is shown.

According to the formula 1.9, the quantization values of all small blocks are computed and a quantization value map is created. An example of a quantization value map is shown in FIG. 6. The figure shown in a small domain of FIG. 6 is the quantization value of each small domain. The figures have the feature such that the quantization value in the selected domain is getting smaller as the distance between the center of the selected domain and the small domain is getting smaller.

As mentioned above, the gradual coding parameter calculation section (112) creates a quantization value map that shows the quantization value of each small block, and outputs it to the quantization section (103).

STEP203: Image Coding Processing

In the image coding processing, picture signals are divided into 8×8-pixel blocks, the DCT processing and inverse DCT processing are performed for every block, and the subtraction processing, the addition processing, the quantization processing, the inverse quantization processing, and the VLC processing are carried out for every small block which is a 2×2-block set.

Moreover, each processing section outputs the result of processing to the next processing section after the processing of all blocks or all small blocks in one frame is done.

Using the original picture of one frame input from the image input section (120) and the prediction picture which is the decoded picture of the previous frame input from the frame memory, the subtraction section (108) computes prediction errors and outputs the prediction error to the DCT section (102).

However, in the beginning of coding, since the decoded picture of the previous frame does not exist, the subtraction is not performed.

By applying the DCT transformation to the prediction errors input from the subtraction section (108), the DCT section (102) computes the DCT coefficients and outputs the DCT coefficients to the quantization section (103).

The quantization section (103) performs the quantization processing using the DCT coefficients input from the DCT section (102) and the quantization value map input from the gradual coding parameter calculation section (112).

By dividing a DCT coefficient by the quantization value specified by the quantization value map for every small block, the quantization section (103) computes the quantization DCT coefficients, and outputs the quantization value map and the quantization DCT coefficients to the VLC section (104) and the inverse quantization section (105).

The VLC section (104) applies the variable length coding to the quantization value map and the quantization DCT coefficients input from the quantization section (103), outputs the result to the output section (114), and outputs the amount of generated codes to the bit amount control section (113).

Using the amount of generated code input by the VLC section (104), the bit amount control part 113 computes the bit amount to be allocated to the following frame, and outputs it to the gradual coding parameter calculation section (112). The computation of the bit amount of the frame i is shown in the formulas 1.10 and 1.11.

In the current mode for carrying out the present invention, the bit amount control is done for every number of frames the number of which is determined beforehand. The unit for the bit amount control will be called GOP hereafter. In the formula 1.10, $B_{GOP}$ denotes the bit amount allocated to one GOP in the bit amount control, T denotes the transmission bit rate, $N_{GOP}$ denotes the number of frames in one GOP, and the Framerate denotes the frame rate. In the formula 1.11, Bi denotes the bit amount allocated to the frame i and bj denotes the bit amount generated in the frame j. Here, the transmission bit rate is computed by the signals obtained after the variable length coding (VLC) processing, and means the bit rate of signals including the coded picture signals that actually pass a transmission medium. It is computable from the amount of bits, frame rates, etc.

$$B_{GOP} = \frac{T * N_{GOP}}{Framerate} \quad (1.10)$$

$$B_i = \frac{B_{GOP} - \sum_{j=1}^{i-1} bj}{N_{GOP} - (i-1)} \quad (1.11)$$

STEP204: Image Decoding Processing

The inverse quantization section (105) computes the inverse quantization DCT coefficients by multiplying the DCT coefficients by the quantization values for every corresponding small block using the quantization value map and the quantization DCT coefficients input from the quantization section (103), and outputs the inverse quantization DCT coefficients to the inverse DCT section (106).

The inverse DCT section (106) applies the inverse DCT transformation to the inverse quantization DCT coefficients input from the inverse quantization section (105), computes the prediction errors after decoding, and outputs them to the addition section (109).

The addition section (109) adds the prediction errors after the decoding input from the inverse DCT section (106), and the decoded picture from one frame previous input from the frame memory, computes the present decoded picture, and outputs it to the frame memory (107).

When the decoded picture is input from the addition section (109), the frame memory (107) rewrites the contents of the internal memory to the input decoded picture and outputs the decoded picture to the addition section (109) and the subtraction section (108).

STEP205: Exiting Judgment Processing

As mentioned above, processing of STEP201 to STEP204 is repeated, and image coding is performed. When it is detected at the image input section (120) that no more picture signals are input, it is determined that the coding should be exited and the coding processing is exited.

As mentioned above, by equipped with the domain selection section by which arbitrary domains are selected and the gradual coding parameter calculation section which computes the gradual quantization values such that the values are small in the central part of the selected domains and the values get larger toward the outside, the image coding equipment can improve the image quality inside the selected domains and the difference of the quantization errors at the boundaries of the selected domains small and can offer a natural picture in which there is no sense of incongruity on the entire picture.

In the current mode for carrying out the present invention, an example in which users select domains has been shown so far. It is also possible, however, for the image coding equipment to have the automatic domain selection section that selects the domains of the objects within a picture by automatically recognizing portions in which there are many beige parts as the objects, like that of human faces, for example.

For example, it is preferable that when there is an object that moves exceeding a certain level, the object is recognized as an object to be noticed and to be identified and the domain within the picture of the recognized object is selected.

Here, the term "recognition" means to specify an object. It is not, however, necessary to specify what the object is. But it may be the case that using the pattern recognition technology etc., an object that moves exceeding a certain level is specified and the automatic selection of a domain is performed based on the specification. For example, when the processing of such an object is specified as a running human or a snow flake falling from the sky, and the domain in which a running human appears is selected, but the domain in which a falling snow flake is not selected (the concept of "recognition" explained here is applied to this specification unless a contradiction occurs).

The domain automatic selection section replaces the domain selection section (111) in the image coding equipment explained at the starting part of the current mode for carrying out the present invention. Hereafter, the domain automatic selection section is explained.

When the Domain Automatic Selection Section has the Motion Value Detection Means The domain automatic selection section consists of a "motion value detection means", a "motion value judgment means", and a "selection means."

The "motion value detection means" detects the motion value which is the largeness of a motion of an image. A "motion value" means the value (difference of a motion) by which the object moved to the present frame from the previous frame. There is also the case in which "the value by which the object moved" also means a motion vector, which includes the direction of the motion as well as the distance of the motion. The motion value detection means detects the motion of an object from the previous frame to the present frame, and the values detected are passed to the motion value judgment means, which is the next means to the motion value detection means.

The "motion value judgment means" judges whether the values detected by the motion value detection means are beyond predetermined values. Here, the comparison of the motion values detected by the motion value detection means and the predetermined values is performed. The predetermined value may be a certain fixed value or a value specified by users according to the scene.

It is convenient that the predetermined value can be set to be a small value so that a small motion can be detected when the motion of a human is not large as in the case of a TV conference or a videophone. For example, when the predetermined value is set to be 5% of the width of a screen (i.e., a window shown in a display of a TV set, etc) if a speaker or an arm of the speaker moves to point out something moving 5% or more of the width of the screen, it is recognized as the object to be noticed. On the other hand, motions of objects in an image may be very large such as in the case of image of a sport relay broadcast. In such a case, if the predetermined value is too low, almost all objects will exceed the predetermined value, and differentiation by improvement of quality of image in the specific domains cannot be achieved, and a load is applied to the subsequent processing. Therefore, it is good to set the predetermined value as bigger values (30% of the width of a screen, for example). If such a setup is performed, a player with comparatively few motions because of being attached to defense etc. will not be recognized as an object to be noticed and to be checked.

When the judgment result of the motion value judgment means does not fulfill the predetermined values, there is no recognition that it is the picture of an object to be noticed and to be checked by looking is carried out, and no selection of a domain is performed, either. On the other hand, when the judgment result is beyond the predetermined values, the recognition that it is the picture of an object to be noticed and to be checked is carried out, and the information for pinpointing the domain of the object is passed to the selection means, which is the next means.

The "selection means" selects a domain the image quality of which should be improved when the judgment result of the motion value judgment means is beyond the predetermined values. It is because the recognition that it is the picture of an object to be noticed and to be checked by looking is made when the judgment result of the motion value judgment means is beyond the predetermined values. A domain is selected according to the information for pinpointing the domain passed from the motion value judgment means.

After the selection, it may be the case that the processing by the "gradual coding parameter calculation section" is performed on the selected domain.

In the gradual coding parameter calculation section, the quantization values are computed so that they change gradually from the center of the selected domains by to the direction of the boundaries of the selected domains.

Moreover, the calculation method of making them change from the boundaries of the selected domains gradually to the direction of the center of the selected domains may be sufficient as the method of this calculation of quantization values. As long as it is the method such that the quality of images of the centers of the selected domains is the best and the quality of image of other portions is deteriorated gradually as the distance of the portion and the boundaries of the selected domain is getting larger, other calculation methods may be used.

Moreover, the method of improving the quality of image inside the selected domains uniformly and deteriorating gradually the quality of image of the picture of exterior of the selected domains may be used. In this case, the gradual coding parameter calculation section computes the quantization values by changing gradually in the form which surrounds the selected domain from the boundaries of the selected domains to their outside.

By performing the processing mentioned so far, the selected domains are coded by using the gradually changing quantization values and the natural image which does not give the sense of incongruity on the entire picture can be offered without producing large block noises.

When the Domain Automatic Selection Section has the Face Detection Means

The domain automatic selection section consists of a "color signal detection means," a "color signal judgment means," and a "selection means."

The "color signal detection means" detects the color signals that are the color of the image. The "color signal" means the signals that can assign the level equivalent to brightness to each ingredient as pixel value and can specify colors by dividing a color for every ingredient. As a method of dividing a color for every ingredient, there is the method of dividing into a luminance (Y) ingredient and a chrominance ingredient, the method of dividing into R (red), G (green), and B (blue) ingredient, etc., for example. For example, according to RGB ingredient expression, an actual color is reproducible if the pixel values of R, G, and B of three ingredients are detectable from a color signal. The detected color signals are passed to the color signal judgment means that is the following means.

The "color signal judgment means" judges whether the color signals detected by the color signal detection means are the predetermined color signals.

The "predetermined color signal" is a color signal of the color that the object has in the picture to which the quality of image should be improved (or it can be presumed that it probably has), and the color of beige that is the color of a person's face is said as an example. The predetermined color signal may be fixed to a specific color, such as beige. In another case, a user may set up the predetermined color signal arbitrarily according to a scene. For example, as an object to be noticed and to be checked by looking other than faces of speakers etc in a TV conference, there is an object relating to the theme of the conference. On a TV conference, when characters are written with blue pens and the color signals of blue are set as the specific color signals, the motion of the blue pens by which characters are written on a white board can reappear vividly and the characters written on the white board are easy to read for the attendants of the TV conference.

Moreover, when the image quality of an object of the specific color is set up to be improved, it is convenient because the color specification can be changed as the objects to be noticed and checked by looking changes and the image quality of an object always to be noticed and checked by looking can be improved.

It may be the case that the information about a setup of a predetermined color signal is sent to others along with a picture signal. Since the information about a setup of the color signal sent along with a picture signal is the color signal of the object corresponding to the image to be observed most and checked by looking, it can raise the quality of image of a required picture certainly, and is convenient. In case goods are advertised on a TV show, when the first goods are apples and the following goods are mandarin oranges, at the time of introduction of the first goods, it is good to set up the color signals of red to be the predetermined color signals, and at the time of introduction of the second goods, it is good to set up the color signals of orange to be the predetermined color signals. Since the informer side grasps objects to be observed and to be checked and their color signals, the exact colors can always be specified.

When the judgment result of a color signal judgment means does not agree with the predetermined value, the recognition that it is the domain of an object to be observed and to be checked by looking is not carried out, and the selection of a domain is not performed, either. On the other hand, when a judgment result agrees with the predetermined value, the recognition that it is the picture of an object to be observed and to be checked by looking is carried out, and the information for pinpointing the domain is passed to a selection means, which is the following means.

The "selection means" selects the portion of the image whose color signal is predetermined as the domain whose quality of image should be improved when the judgment result of the color signal judgment means agrees with the predetermined color signal. It is because the recognition that it is the picture of an object to be observed and to be checked by looking is made when the judgment result of the color signal judgment means agrees with the predetermined value, or when the judgment result of the color signal judgment means agrees with one of the predetermined values (in case there are two or more predetermined values). Moreover, the predetermined value may be specified by a specific numerical value or by a range of numerical values.

A domain is selected by the information for pinpointing the domain passed from the color signal judgment means.

Then, it may be good that the processing of the "gradual coding parameter calculation section" is performed on the selected domain. As already stated on the processing of the gradual coding parameter calculation section, the quantization values that change gradually are computed and the resultant image does not give a sense of incongruity on the entire picture.

Moreover, the method by which the image quality inside the selected domains are uniformly improved and the image quality of the domains surrounding the selected domains is gradually deteriorated is effective especially when a person's face is made into the selected domain by setting up the predetermined color signal to be the color signal of beige. This is because the image quality of the central part of the person's face in the selected domain is the clearest and the image quality of the boundary part of the person's face is equal to the image quality of the background portion when the quantization values are gradually changed in the selected domains with a shading off processing while the image quality of the entire part of the person's face in the selected domain is clear and the image quality of the background portion of the face is gradually deteriorated when the quantization values are changed gradually outside of the selected domain.

Processing of these series is performed automatically, and the difficulty and complexity at the time when users select domains are excluded.

Moreover, it is also possible to perform the bit amount allocations according to the degree of the complexity of small blocks as is performed in the general bit amount control processing although the bit amount allocations to the small blocks internal and external of the selected domains are performed using the uniform values in the description so far.

The Second Mode for Carrying out the Present Invention

In the second mode for carrying out the present invention, an image coding equipment is described by which arbitrary domains can be selected, the frame rates in the selected domains are raised, the frame rates from the center of the selected domains toward their outsides are changed gradually, and the natural picture without the sense of incongruity on the entire picture is offered as an image coding equipment which codes image signals so that the result of coding is within the predetermined transmission bit rate.

Figure 7:
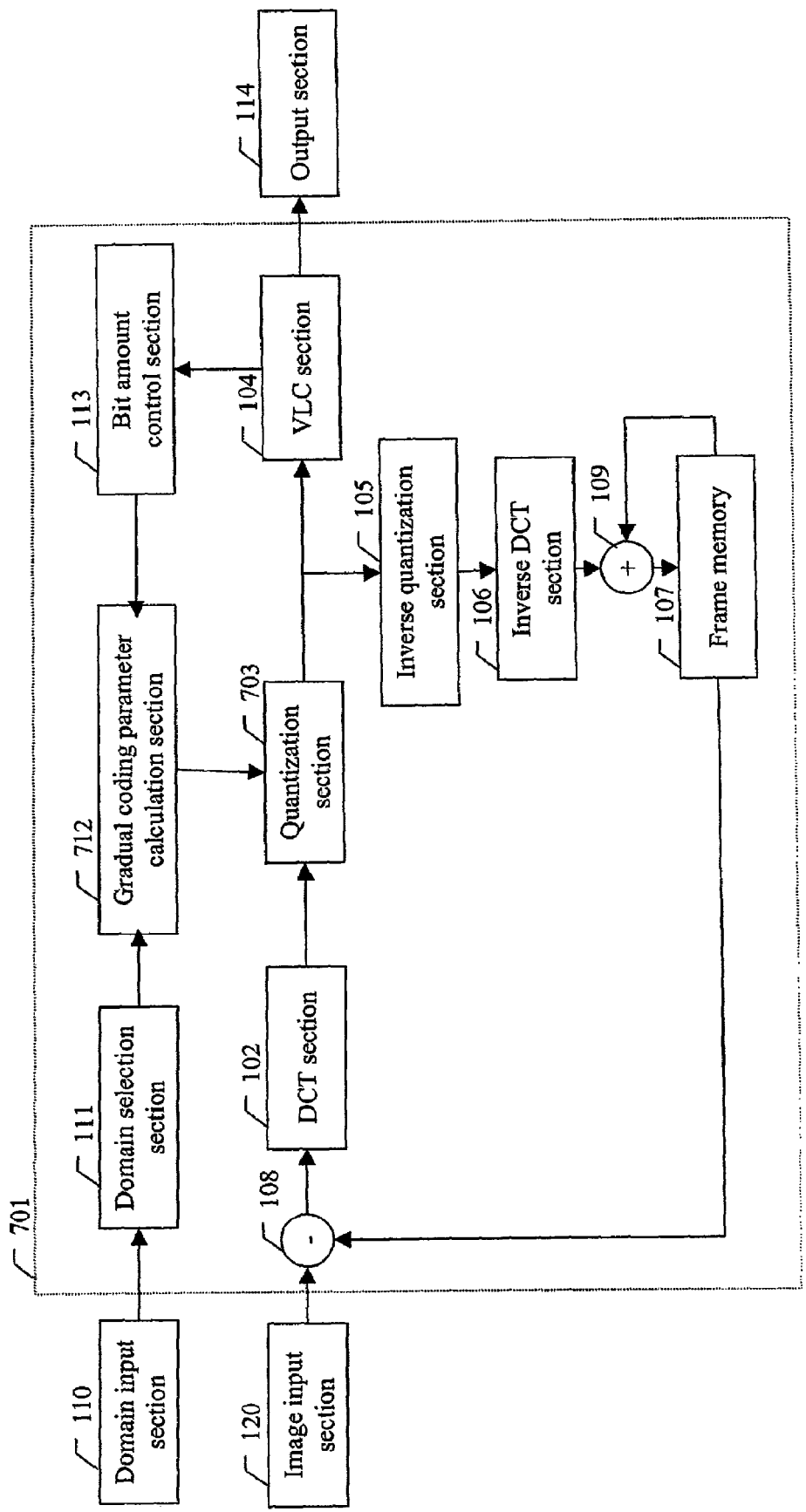
FIG. 7 illustrates a block diagram showing the composition of the image coding equipment in the second mode for carrying out the present invention.

The block diagram of the image coding equipment in the second mode for carrying out the present invention is shown in FIG. 7. In FIG. 1, the blocks of the same operation as the first mode for carrying out the present invention is showed the same block numbers in FIG. 1. In FIG. 7, the blocks of different operations from those in the first mode for carrying out the present invention are the gradual coding parameter calculation section (712) and the quantization section (703), and these are explained below.

In this mode for carrying out the present invention, the gradual coding parameter calculation section (712) computes the value of the frame rates which change in the direction of the boundaries of the selected domain from the center of them gradually using the selection domain map by which the domain information whose image quality is to be improved is shown and which is input from the domain selection section (111) and the bit amount Bi allocated to the frame i input from the bit amount control section (113)

The calculation procedure of the gradual frame rates in the gradual coding parameter calculation section (712) allocates the bit amount to the small blocks internal and external the selected domains as is done in the similar processing of the gradual bit amount allocation to the small blocks external and internal of the selected domains in the gradual coding parameter calculation section (112), and the gradual frame rate are calculated based on the bit amount allocated.

Calculation of a Gradual Frame Rate

The gradual coding parameter calculation section (712) will compute gradual frame rates that become smaller toward the outside from the center of the selected domains according to the bit amount of all small blocks.

Before the calculation of frame rates, the quantization values of Frame i is computed according to the formula 2.1. In the formula 2.1, Qi is the quantization value of Frame i, Bi the allocated bit amount of Frame i, N the number of the small blocks in the frame, and f(x) a function which returns a quantization value to a bit amount as described in the formula 1.9.

$$Q_i = f(B_i/N) \qquad (2.1)$$

An example of the calculation method of gradual frame rates is shown in the formula 2.2. In the formula 2.2, $fps_n$ is the frame rate of the small block n, An the bit amount allocated to the small block n, and g(x,q) a fixed function returning a frame rate to a bit amount x and a quantization value q such that the bigger the bit amount x and the quantization value q are the bigger frame rate it returns.

$$fps_n = g(A_n, Q_i) \qquad (2.2)$$

When the frame rates of all small blocks are computed according to the formula 2.2, frame rates are obtained that are higher at the central part of the selected domains and become gradually lower as they approach to the outside.

The gradual coding parameter calculation section (712) computes the frame rate map in which the frame rate computed for every small block is shown and the quantization values and outputs them to the quantization section (703).

Figure 8:
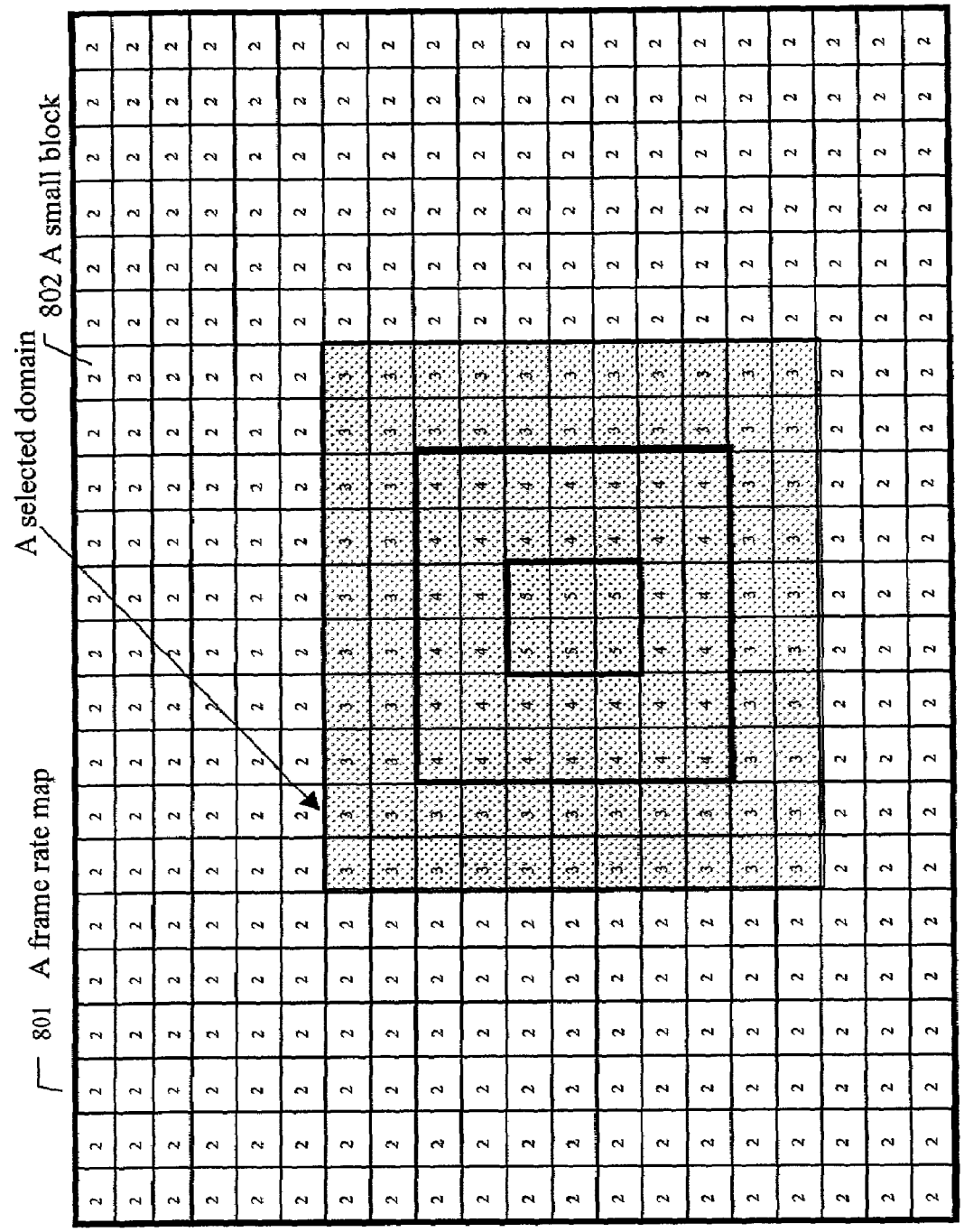
FIG. 8 illustrates a view showing an example of the frame rate map in which the frame rate of each small block is shown.

An example of a frame rate map is shown in FIG. 8. In FIG. 8, the number shown in each small block expresses a frame rate.

The quantization section (703) quantizes the DCT coefficients input from the DCT section (102) using the quantization value Qi and frame rate map which are input from the gradual coding parameter calculation section (712). The quantization section (703) differs from the quantization section (103) in the first mode for carrying out the present invention in the points such that it is equipped with a frame counter and offers frame rates different for every small block by referring to the frame rate map.

Below, how to offer frame rates different for every small block a frame is explained. With reference to the frame rate map, the quantization section (703) quantizes the DCT coefficients in the small block whose frame rate is the same as the input frame rate and outputs the quantization DCT coefficients to the VLC section (104) and the inverse quantization section (106). On the other hand the truth of the formula 2.3 is judged for the small blocks whose frame rate is different from the input frame rate.

Namely, the DCT coefficients is quantized when the formula 2.3 is true while all DCT coefficients are made into zero and the coefficients containing zeros are output as the quantization DCT coefficients to the VLC section (104) and the inverse quantization section (106) when the formula 2.3 is false.

In the formula 2.3, i is the value of the frame counter, x mod y is the remainder of the division x by y, $fps_{input}$ is the input frame rate, and $fps_n$ is the frame rate of small block n.

$$\left[i \bmod\left(\frac{fps_{input}}{fps_n}\right)\right] = 0 \qquad (2.3)$$

As mentioned above, with the frame rates of small blocks, and the value of the frame counter, it is possible to change the frame rate within a frame to false by making the DCT coefficients zeros. The value of the frame counter is increased by one after the quantization section (703) performs quantization processing to all small blocks.

As mentioned above, with the domain selection section by which arbitrary domains in a picture are selected and the gradual coding parameter calculation section which computes the frame rates such that the frame rates at the center of the selected domains are higher and the frame rates gradually become small toward the outside of the selected domain, the image coding equipment makes the frame rates higher as they approach the center of the selected domains and makes the motions in the picture smooth and better. Furthermore, since the frame rate becomes smaller as it goes to the outside of the selected domain and the discontinuity generated according to the difference of the frame rates on the boundaries of the selected domain can be made small, the natural picture which does not give sense of incongruity as the entire picture can be offered.

In addition, although an example in which each frame rate is computed from the bit amount allocated inside and outside of the selected areas is showed in this mode for carrying out the present invention, it is not limited to this example in which the bit amount is used. In the image coding at the low bit rates, the frame skipping processing may be performed especially, by not coding the frames or the small blocks using the remaining capacity of the virtual buffer and the frame skipping threshold, which are generally used in the area of the image coding. The virtual buffer is a buffer which stores the coding result of the image with which image coding equipment (701) is equipped, and is a buffer used in order to output the image coding result of the output section (114) to the transmission way at the fixed rate. Image coding equipment (701) can change the frame rate as a result by setting up the frame skipping threshold which determines whether to code or not to code the image according to the size of remaining capacity of the virtual buffer, and performing small block dropping processing. Using this, the frame skipping threshold is gradually calculated based on the remaining capacity of the virtual buffer from each area in a picture, and the frame skipping processing is performed for every area as compared with the bit amount generated at every area. Thereby, the number of skipped frames is made gradual toward the outside from the center of the selected domains, and it also becomes possible to offer a picture without the sense of incongruity on the entire picture.

The Third Mode for Carrying out the Present Invention

In the third mode for carrying out the present invention, an image coding equipment is described which codes image signals so that the result of the coding satisfies the transmission bit rate and by which arbitrary domains can be selected, the image quality of the selected domains are improved, and by gradually changing the characteristics of the pre-filter a natural image can be offered without the sense of incongruity on the entire picture.

Figure 9:
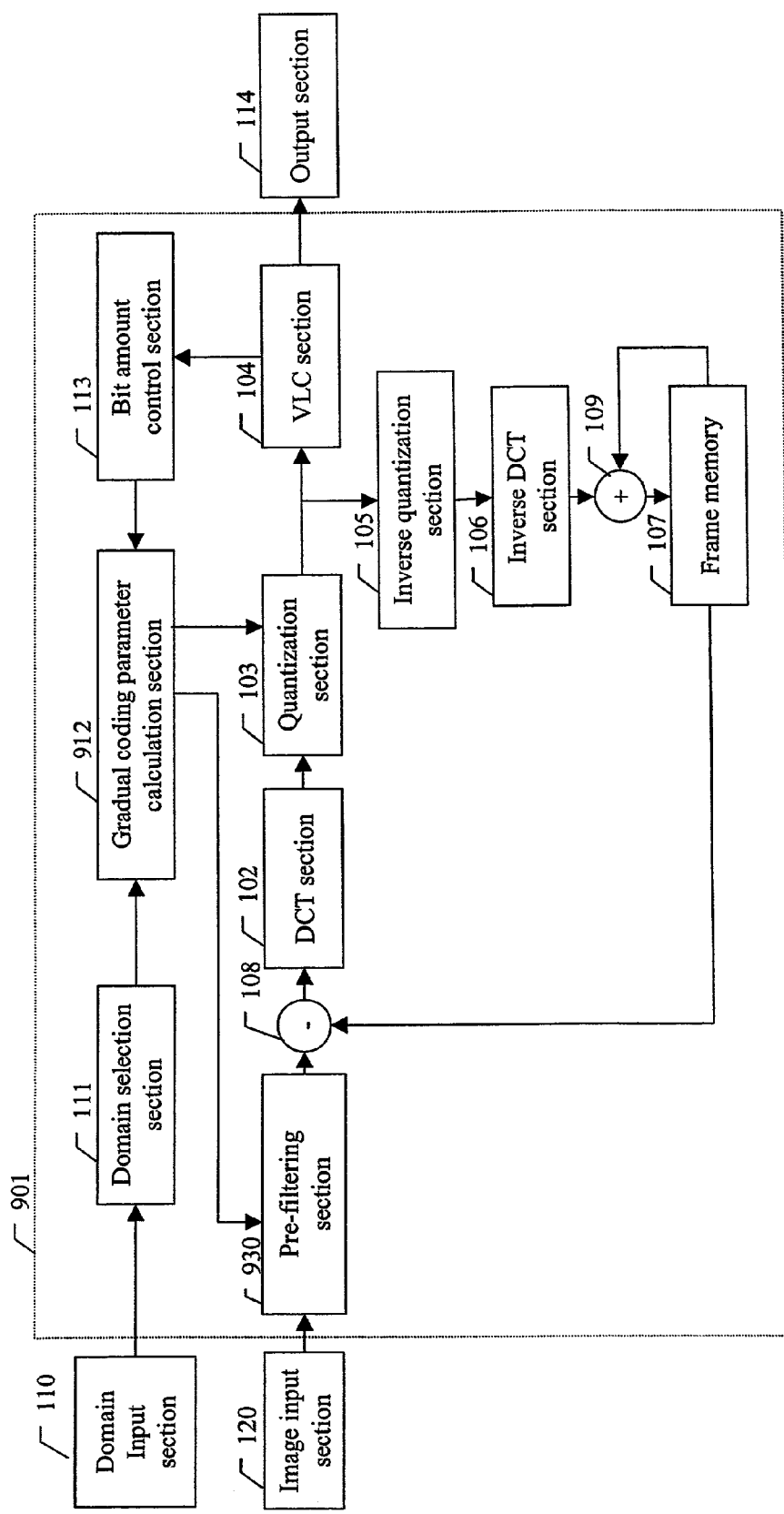
FIG. 9 illustrates a block diagram showing the composition of the image coding equipment in the third mode for carrying out the present invention.

The block diagram of the image coding equipment in the current mode for carrying out the invention is shown in FIG. 9. In FIG. 9, the same numbers as the first mode for carrying out the present invention are given to the operation blocks of the same operations as in the first mode. In FIG. 9, the operation blocks constituting the image coding equipment (930) and which are different from the first mode for carrying out the present invention are the pre-filtering section (930) and the gradual coding parameter calculation section (712). These two operation blocks are explained below.

In this mode for carrying out the present invention, the gradual coding parameter calculation section (712) computes the characteristic values of the pre-filter which changes gradually in the direction toward the boundaries of the selected domains from the center of the selected domains using the bit amount Bi allocated to the frame i input from the bit amount control section (113) and the selection domain map of the information of domains whose image quality should be improved input from the domain selection section (111).

In the calculation procedure of the gradual coding parameter calculation section (912), the gradually changing characteristic values of the pre-filter is calculated by the code allocations to the small blocks inside and outside of the selected domains as is done in the processing of the gradual allocations of bit amount to the small blocks in the gradual coding parameter calculation section (112) of the first mode for the present invention.

In this mode for carrying out the present invention, a flat and smooth-ized filter is used as a pre-filter, and let the characteristic values of the filter be the number of taps of the flat and smooth-ized filter. That is, the pre-filter of the number M of taps replaces the pixel value of the center of (2M+1)*(2M+1) pixels by the average value of (2M+1)*(2M+1) pixels.

The pre-filter is, however, not limited to the flat and smooth-ized filter, and any filters can be used.

The calculation method of the gradual characteristic values of the pre-filter is shown in the formula 3.1.

In the formula 3.1, Tn is the number of taps on the small block n of the pre-filter, An the allocated bit amount of the small block n, and h(x) a function returning the number of taps to the bit amount x such that the larger the bit amount x is the smaller number of taps is returned.

$$T_n = h(A_n) \qquad (3.1)$$

The number of taps which is the characteristic value of the pre-filter to each small block according to this formula 3.1 is calculated and a pre-filter characteristic maps is computed. An example of a pre-filter characteristic map is shown in FIG. 10.

Figure 10:
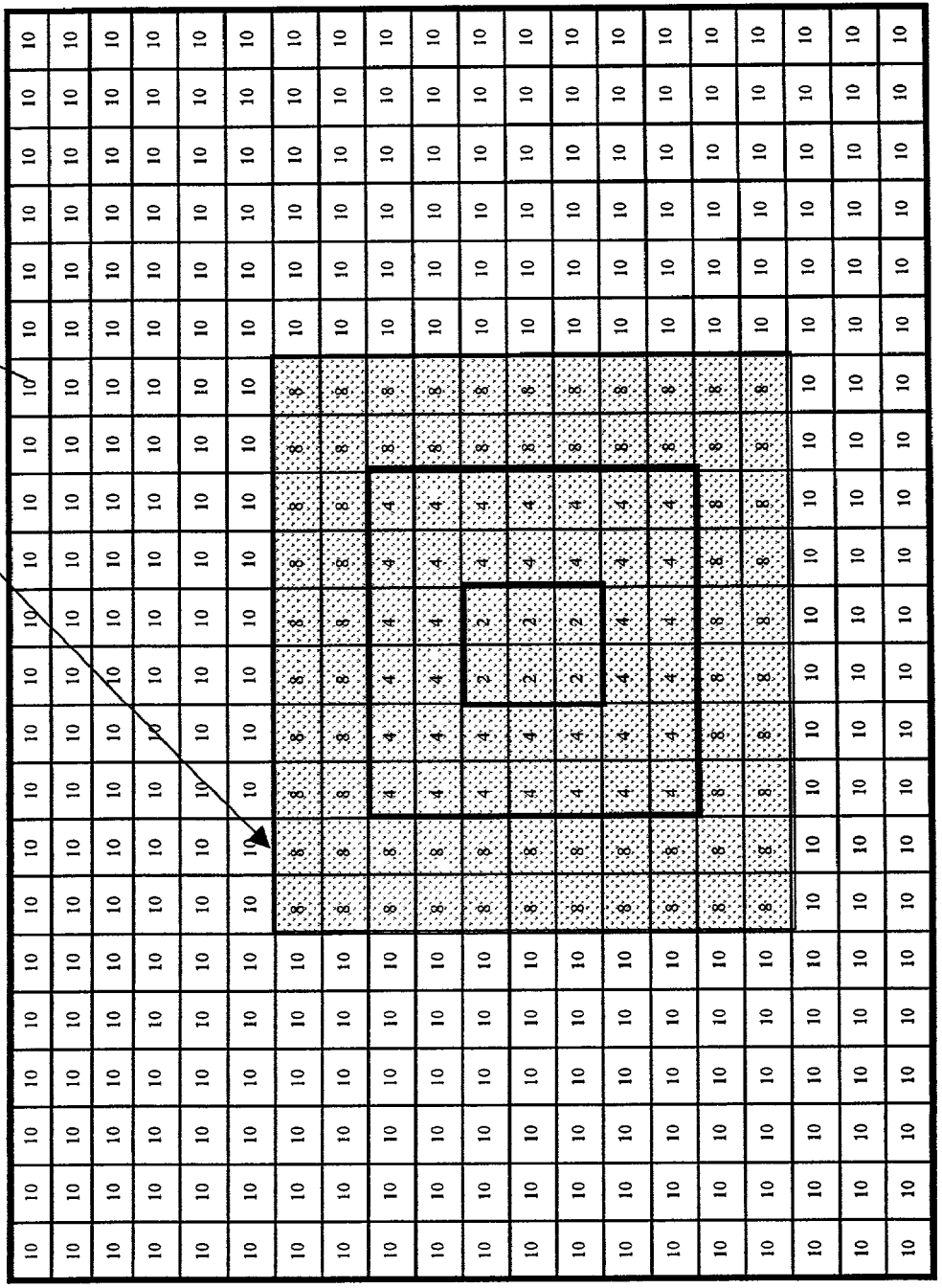
FIG. 10 illustrates a view showing an example of the pre-filter characteristic map in which the pre-filter characteristic of each small block is shown.

In FIG. 10, the numerical value shown in each small block is the number of taps of the pre-filter, and it has the feature that it is gradually increasing as it is near the center of the selected domains and is gradually decreasing as it is near the outside. Moreover, the gradual coding parameter calculation section (912) outputs a pre-filter characteristic map to the pre-filtering section (930) while it computes the quantization values of small blocks and outputs a quantization value map to the quantization section (103) according to the formula 1.9.

The pre-filtering section (930) performs flat and smooth-ized processing to the original picture image input from the image input section (120) using the flat and smooth-ized filter of the number of taps in the pre-filter characteristic map input from the gradual coding parameter calculation section (912), and outputs the result of filtering to the subtraction section (108).

In the filtering section, the larger the number of taps of the flat and smooth-ized filter is, the larger the high frequency ingredient is filtered. So the bit amount becomes small after the image coding and a faded picture is offered.

As mentioned above, because the image coding equipment (901) has the domain selection section by which arbitrary domains in a picture are selected, the gradual coding parameter calculation section which computes the gradually changing characteristic values such that the number of taps increases toward the outside, and the pre-filtering section, as which image coding equipment 901 chooses the arbitrary domains in a picture, a natural picture without a sense of incongruity on the entire picture can be offered by making the image quality better at the center of the selected domains and faded toward the boundaries and also by making the difference of image quality deterioration small.

The Fourth Mode for Carrying out the Present Invention

In the fourth mode for carrying out the present invention, an image coding equipment which codes picture signals so that the result of coding satisfy the determined transmission bit rate and which has a priority input section to which users can set priorities of the coding parameters in the selected domains and a coding parameter calculation section which changes the parameter values from the low priority parameters, codes the picture signals so that the coding result satisfy the determined transmission bit rate, and can offer a picture of quality based on the priorities users set.

Figure 11:
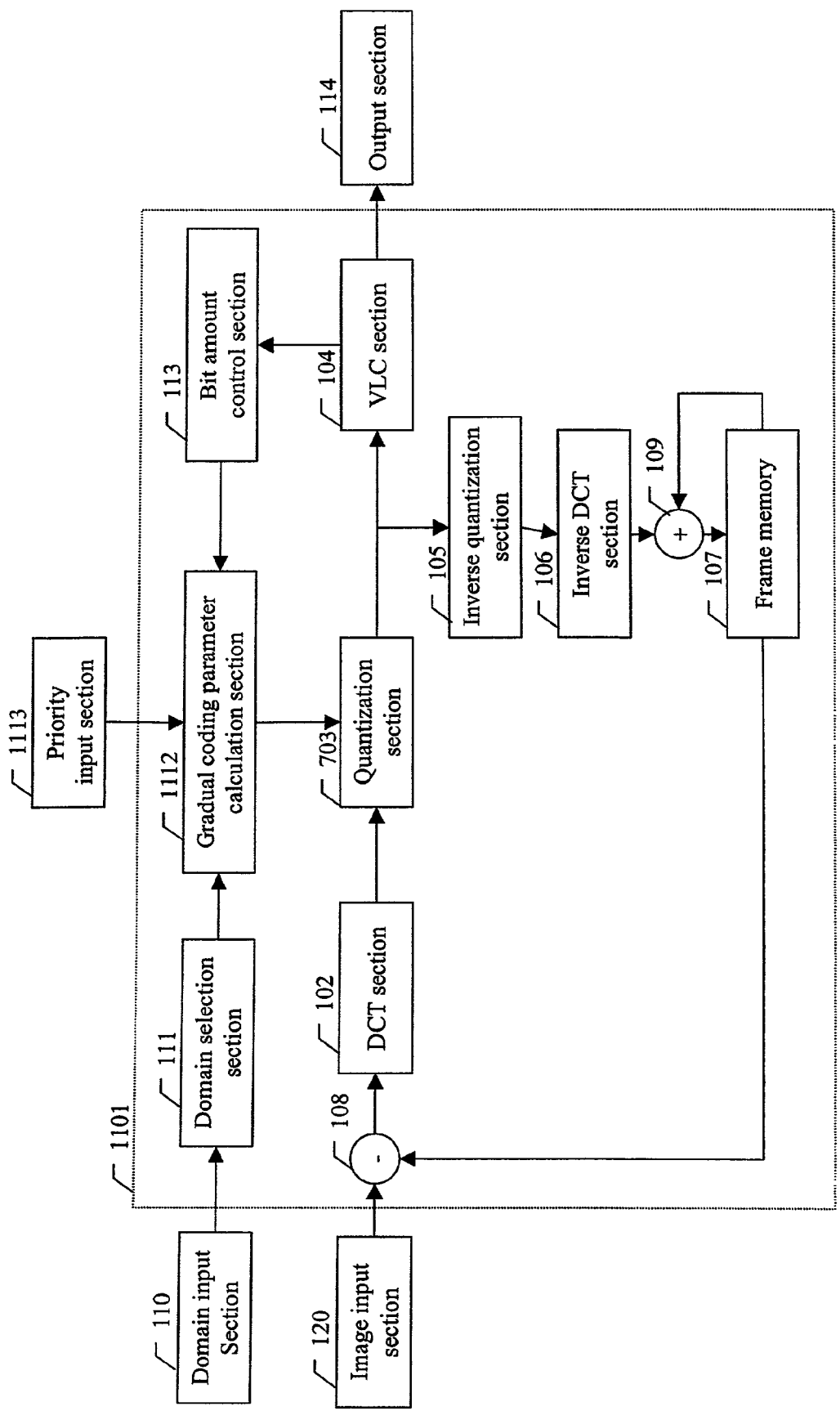
FIG. 11 illustrates a block diagram showing the composition of the image coding equipment in the fourth mode for carrying out the present invention.

The block diagram of the image coding equipment in this mode for carrying out the present invention is shown in FIG. 11. In FIG. 11, the same numbers as in the first to third modes for carrying out the present invention are given to the operation blocks of the same operation.

In FIG. 11, the new operation blocks which appear in this mode for carrying out the present invention are two: the priority input section (1113) and the coding parameter calculation section (1112). Below, these two operation blocks are explained.

The priority input section (1113) is a section to which users can specify priorities of the coding parameters of the selected domains. In this mode for carrying out the present invention, as coding parameters the priorities of which users can specify three parameters are assumed: the quantization values, the frame rates, and the selection domain size, and the priority input section (1113) outputs to the coding parameters calculation section (1112) the priorities which are specified after setting up the priorities to these three parameters in the selected domains.

The coding parameter calculation section (1112) computes three coding parameters in the selected domains using the selection domain map input from the domain selection section (111) and the bit amount Bi of the frame i input from the bit amount control part (113) and outputs the computed results to the quantization section (703).

The coding parameter calculation method in the coding parameter calculation section (1112) is explained. The flow of coding parameter calculation processing is shown in FIG. 12.

Figure 12:
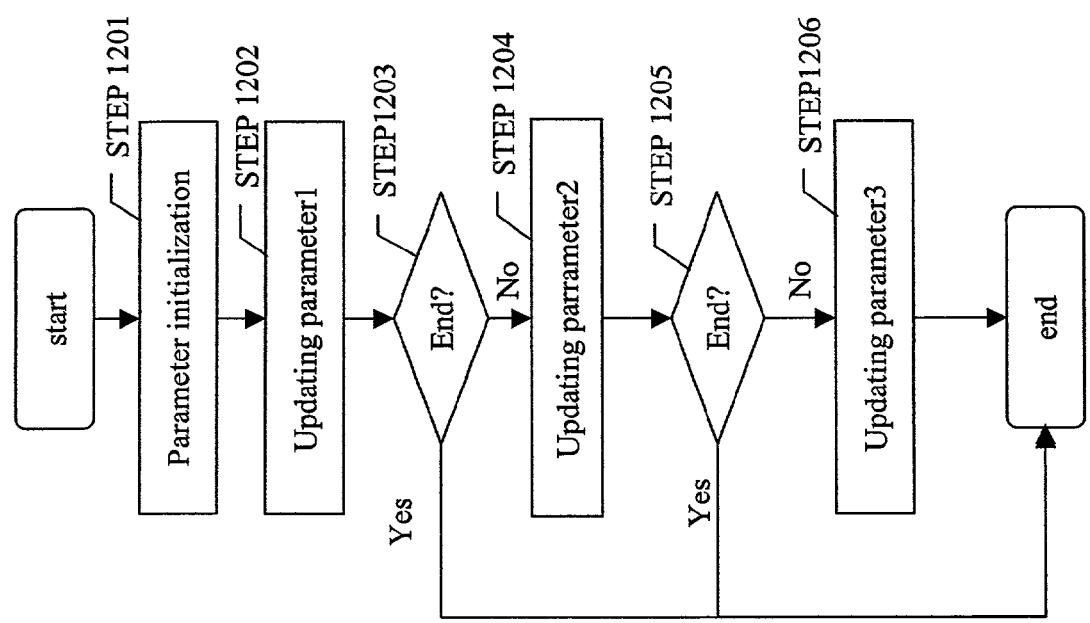
FIG. 12 illustrates a flow chart that shows the flow of coding parameter calculation processing.

In FIG. 12 the processing consists of six steps: STEP1201: Coding parameter initialization processing which initializes the coding parameters, STEP1202: Renewal processing of the coding parameter of the third place of the priority, STEP1203: End judging processing, STEP1204: Renewal processing of the coding parameter of the second place of the priority, STEP1205: End judging processing, STEP1206: Renewal processing of coding parameter of the first place of the priority. The details of each processing are explained below.

STEP1201: Coding Parameter Initialization Processing

In this processing, the initial value of the coding parameters of inside and outside of the selected domains are set up using the bit amount Bi of the frame i and the selection domain map.

The calculation method of the initial coding parameters is shown in the formulae from 4.1 to 4.4. In the formula 4.1, $Q_L$ is the quantization value outside the selected domain, f(x) a function, similar to the formula 1.9, to calculate the quantization values, Bi the amount of code allocated to the frame i, $a_{bit}$ a coefficient whose values is less than 1 to reduce the bit amount allocated to the outside of the selected domain, and N the number of small blocks in one frame. In the formula 4.2, $Q_{init}$ is the initial value of the quantization value of the blocks in the selected domain, and $a_q$ is a coefficient to make the quantization values inside of the selected domain smaller than those outside and to improve the image quality. In the formula 4.3, $fps_L$ are the frame rates outside the selected domains, and g(x) is a function, similar to the formula 2.2, to calculate the frame rates. In the formula 4.4, $fps_{init}$ is the initial frame rate in the selected domain, and $a_{fps}$ is a coefficient to make the frame rates in the selected domain larger than the other domain.

$$Q_L = f(Bi * a_{bit}/N) \tag{4.1}$$

$$Q_{init} = Q_L/a_q \tag{4.2}$$

$$fps_L = g(Bi * a_{bit}/N, Q_L) \tag{4.3}$$

$$fps_{init} = fps_L * a_{fps} \tag{4.4}$$

Thereby, the coding parameter calculation section (1112) computes the initial quantization value and the initial frame rates in the selected domain after computing the quantization values and a frame rate outside the selected domain using each coefficient.

The size of the selected domain itself, which is the 3rd coding parameter, input from the domain selection section (111) is used for the initial value of the size of the selected domain.

STEP1202: Renewal Processing of the Coding Parameter of the 3rd Place of the Priority In this processing, updates of the coding parameter of the 3rd place are done.

The following explanation is done based on the example in which the size of domain is in the first priority, the quantization value in the second priority, and the frame rate the third priority.

Therefore, in this processing, updating of the frame rates of the selected domain is performed so that the transmission bit rate may be filled. The method of updating processing is shown in the formula 4.5.

In the formula 4.5, $fps_H$ is the frame rate after updating, $fps_{init}$ the initial frame rate, $a_{fps}$ the coefficient relating to the frame rate indicated in the formula 4.4, and j the number of updating. In the formula 4.6, $P_L$ is the bit amount predicted to be generated on outside the selected domain, $g^{-1}$ is the inverse function of the formula 2.2, and the function which computes the bit amount predicted to be generated regarding a small block from the quantization value and the frame rate, and $Q_L$ is the quantization value outside the selected domain, and $fps_L$ is the number of small blocks outside the selected domain. In the formula 4.7, $P_H$ is the bit amount generated on the selected domain, $Q_H$ the quantization value outside the selected domain, and $N_H$ the numbers of the small blocks in the selected domain. In the formula 4.9, $P_i$ is the bit amount predicted to be generated in the whole frame i.

And, the formula 4.9 and the formula 4.10 show the end conditions of this processing.

$$fps_H = fps_{init} * \left(1 - \frac{j}{a_{fps}}\right) \quad (4.5)$$

$$P_L = g^{-1}(Q_L, fps_L) * N_L \quad (4.6)$$

$$P_H = g^{-1}(Q_H, fps_H) * N_H \quad (4.7)$$

$$P_i = P_L + P_H \quad (4.8)$$

$$P_i \leq B_i \quad (4.9)$$

$$fps_H \leq fps_L \quad (4.10)$$

Thus, in this processing, the frame rate is updated according to the formula 4.5, and processing is ended in case formulas 4.9 or 4.10 is evaluated to be true. The frame rate at that time is the final frame rate.

On the other hand, when the formula 4.9 and the formula 4.10 are evaluated to be false, the update of the frame rate is repeatedly done using the formula 4.5 with j increased until the processing end condition of the formula 4.9 or the formula 4.10 is satisfied. After the above processing is completed, a frame rate map is created using the frame rate after updating.

STEP1203: End Judging Processing

In this processing, the end judging of calculation processing of the coding parameter is performed. An end judging is carried out using the formula 4.9, and when formula 4.9 is true, namely, when the bit amount predicted to be generated fits within the bit amount allocated, the processing is ended.

On the other hand, when the formula 4.9 is false, the processing goes to STEP1204.

STEP1204: Renewal Processing of the Parameter of the 2nd Place of the Priority In this processing, the coding parameter whose priority is the 2nd place is updated, and the bit amount is refrained from increasing so that the transmission bit rate may be filled. This time, the priority of the coding parameter of the 2nd place is the quantization value.

The updating method of the quantization value is shown in the formula 4.11 and the formula 4.12. In the formula 4.11, QH is the quantization value after updating, $Q_{init}$ the initial quantization value, $a_q$ the coefficient relating to the quantization value in the formula 4.2, and j the number of times of the repetition of updating processing.

$$Q_H = Q_{init} * \left(1 + \frac{j}{a_q}\right) \quad (4.11)$$

$$Q_H \geq Q_L \quad (4.12)$$

Thus, in this processing, updating is done by enlarging the quantization value according to the formula 4.11, and processing is ended in the case where formulas 4.9 or 4.12 is evaluated to be true and the value at that time becomes the final quantization value.

On the other hand, when the formula 4.9 and the formula 4.12 are evaluated to be false, updating is repeated with j in the formula 4.11 increased until the formula 4.11 or the formula 4.12 is satisfied. After the above processing is completed, a quantization value map is created using the quantization value after updating.

STEP1205: End Judging Processing

In this processing, the end judging of calculation processing of the coding parameter is performed. An end judging is based on a formula. The processing is ended when the formula 4.9 is evaluated to be true, that is when the bit amount predicted to be generated fits within the bit amount allocated. To it, when a formula 4.9 is an imitation, it moves to STEP206.

STEP1206: Renewal Processing of a Parameter of the 1st Place of the Priority In this processing, the coding parameter whose priority is the 1st place is updated, and the bit amount of marks is refrained from increasing so that the transmission bit rate may be filled. This time, the first coding parameter in the priority is the size of the selected domain and the selection domain map is updated. The updating method of the selection domain map is shown in the formula 4.13 and the formula 4.14.

In the formula 4.13, Block (k) shows the small block k, $Area_H$ shows the inside of the selected domain, dk is the distance from the center of gravity of the selected domain to the small block k, $a_{Area}$ is a coefficient for updating the size of the selected domain, j is the number of times of the repetition of this processing, and D is the distance to the furthest small block from the center of gravity of the initial selected domain. In the formula 4.14, $Area_L$ shows the outside of the selected domain. In formulae 4.13 and 4.14, x□y means that x is contained in y.

$$Block(k) \in Area_H \text{ if } \left\{0 \leq d_k \leq \left(1 - \frac{j}{a_{Area}}\right) * D\right\} \quad (4.13)$$

$$Block(k) \in Area_L \text{ if } \left\{d_k > \left(1 - \frac{j}{a_{Area}}\right) * D\right\} \quad (4.14)$$

Updating processing on the size of the selected domain is done using the formulae 4.13 and 4.14 by making the selected domain smaller. The bit amount predicted to be generated is calculated using the formula 4.8 and when the formula 4.9 is evaluated to be true, the updating processing is ended.

On the other hand, when the formula 4.9 is evaluated to be false, because the bit amount predicted to be generated does not fit within the bit amount allocated the processing is repeated with j in the formula 4.13 increased until the formula 4.9 is evaluated to be true.

Thus, when the formula 4.9 becomes true, and the bit amount predicted to be generated fits within the bit amount allocated, the processing is ended and the selection domain map is updated using the size of the updated selected domain.

The coding parameter calculation section outputs the frame rate map and quantization value map that were computed through the above processing to the quantization section (703).

Although the case where the size of domain is the first, the quantization value the second, the frame rate the third in the priority is explained this time, the priority may be changed and the processing by the priority change is the change of the update sequence of parameters.

In this mode for carrying out the present invention, users can specify the priority of the coding parameters in the selected domain whose image quality must be improved and the image coding equipment changes the parameters from the low priority to the high priority. Thus the image quality in the selected domain can be kept improved based on the coding parameter of the high priority users specified.

The Fifth Mode for Carrying out the Present Invention

In the fifth mode for carrying out the present invention, an image coding equipment is explained such that a user can specify the image quality to the domain the image quality of which the user wants to improve and which has the necessary bit rate calculation section that calculates the necessary bit rate to code the picture at the specified image quality and outputs the necessary bit rate.

Figure 13:
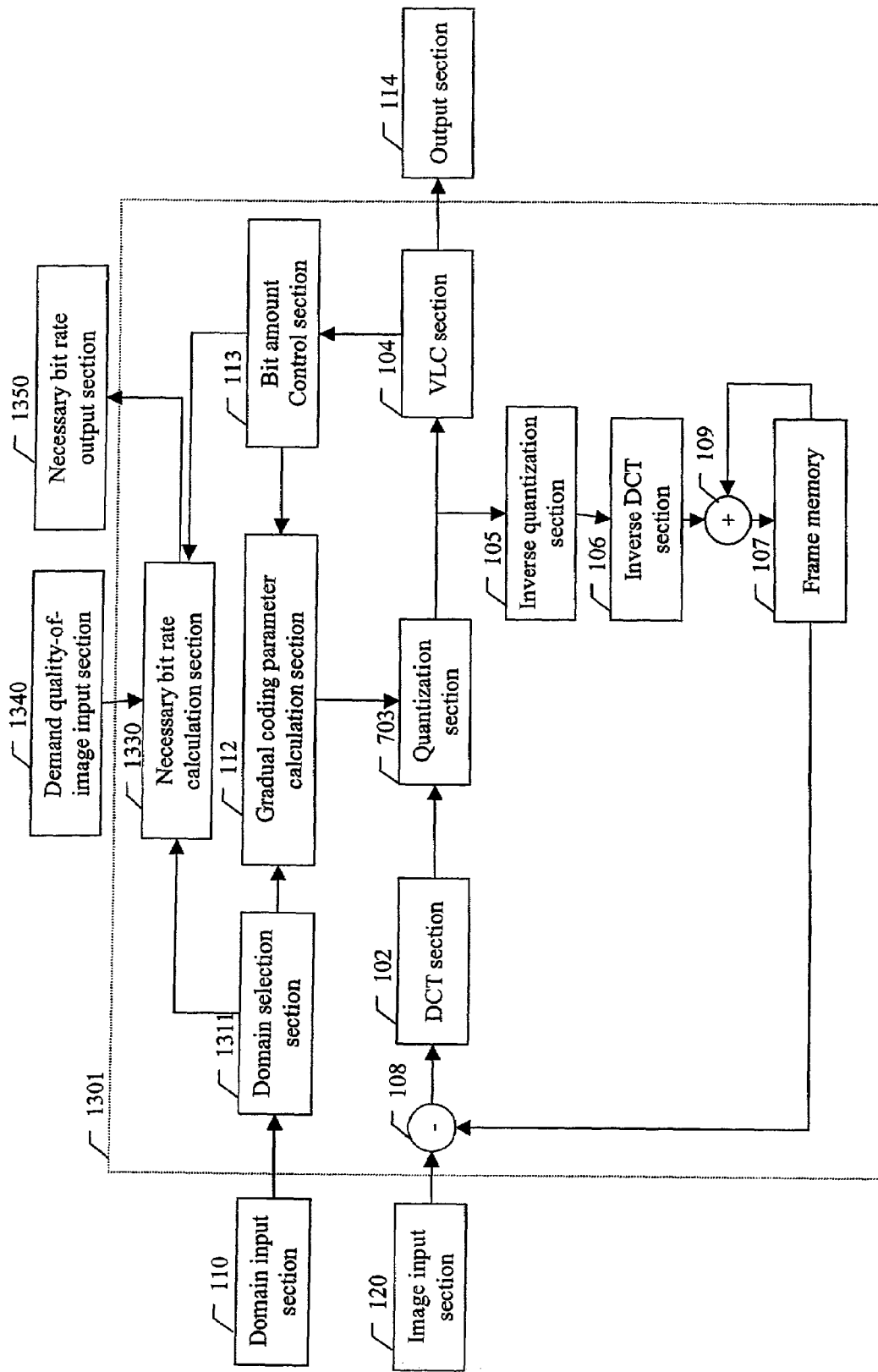
FIG. 13 illustrates a block diagram showing the composition of the image coding equipment in the fifth mode for carrying out the present invention.
Figure 14:
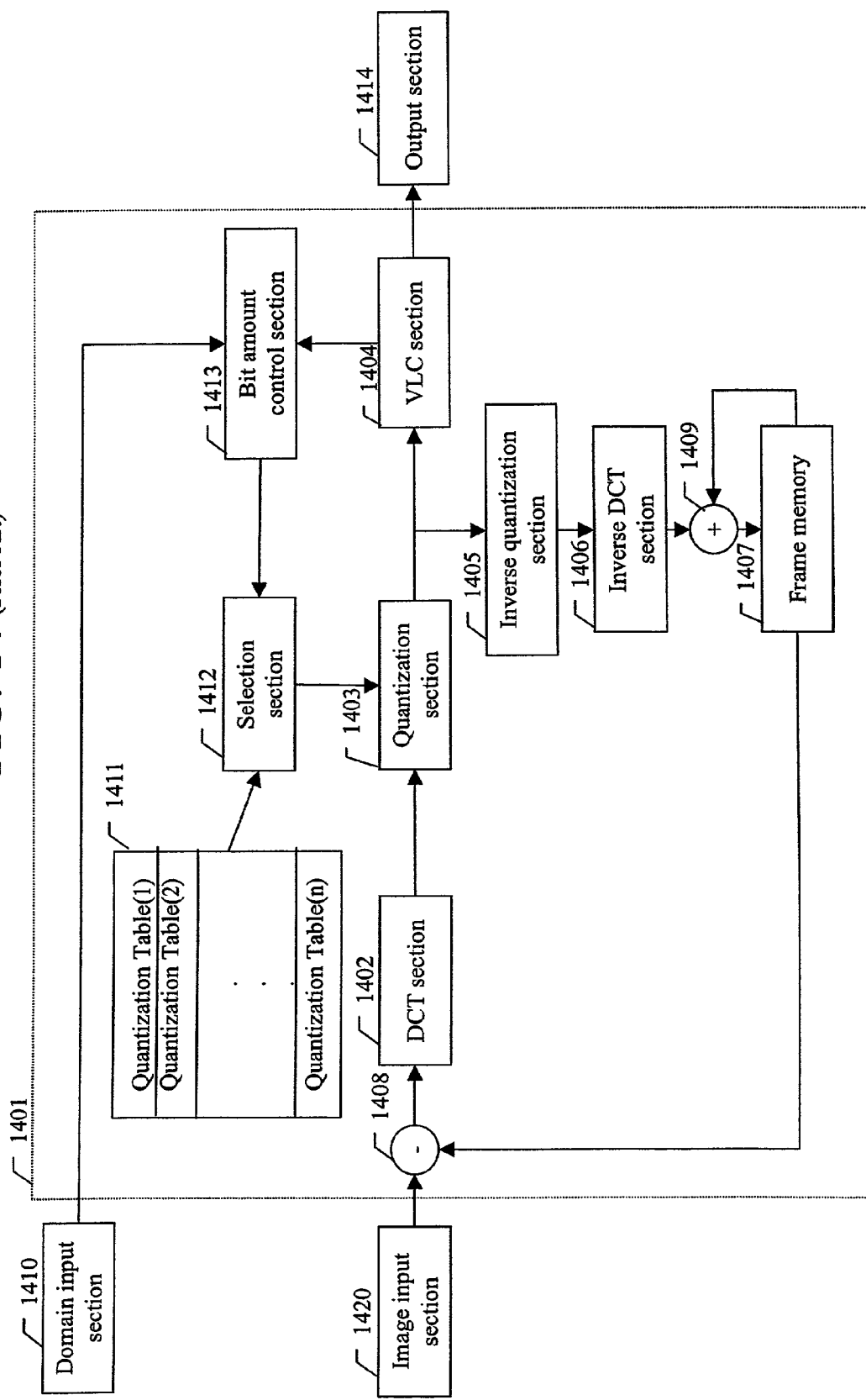
FIG. 14 illustrates a block diagram showing the composition of the image coding equipment in the conventional example.

The block diagram of the image coding equipment in this mode for carrying the present invention is shown in FIG. 13.

In FIG. 13, the image coding equipment (1301) has the necessary bit rate calculation section (1330) connected to the domain selection section (1311) and the demand quality-of-image input section (1340), which is connected to the necessary bit rate output section (1350) in addition to the sections in the first mode for carrying out the present invention. The same numbers are given to the blocks of the same operations in one of the modes from the first to the fourth mode for carrying out the present invention.

Below, the necessary bit rates calculation section (1330) and the demand quality-of-image input section (1340) which are the blocks that newly appeared in this mode are explained.

The demand quality-of-image input section (1340) outputs to the necessary bit amount calculation section (1330) the demand quality of image that the user specified to the selected domain.

Although the specification method of demand quality of image is arbitrary, in this mode for carrying out the present invention, the demand quality of image is specified using the ratio of the coding parameters used to code the selected domain, and the coding parameters used to code the outside of the selected domain. For example, suppose the case where demand quality of image is specified using the quantization values, then the ratio of coding parameters to code the inside and the outside of the selected domain is output to the necessary bit amount calculation section (1330). The calculation method of the ratio of the quantization values which shows demand quality of image is shown in the formula 5.1.

In the formula 5.1, $\alpha_Q$ is the ratio of the quantization values of the inside and outside of the selected domain, and we defined it as the demand quality-of-image parameter, $Q_L$ is the quantization value of the outside the selected domain, and $Q_H$ is the quantization value of the inside of the selected domain.

$$\alpha_Q = \frac{Q_L}{Q_H} \tag{5.1}$$

As shown in the formula 5.1, the demand quality-of-image parameter means the improvement of the quality of image in the selected domain compared with the outside of the selected domain.

The necessary bit rate calculation section (1330) computes the necessary bit rate for coding the selected domain with the demand quality-of-image parameter using the bit amount of the frame i input as the selection domain map input from the domain selection section (1311), and the demand quality-of-image parameter input by the demand quality-of-image input section (1340) from the bit amount control section (113), and outputs it to the necessary bit rate output section (1350).

The calculation method of the necessary bit rate is shown in the formulae from 5.2 to 5.4. In the formula 5.2, $Q_L$ is the quantization value of the inside of the selected domain, f(x) a function that computes quantization values as the formula 1.9 computes them, Bi the bit amount allocated to the frame i, and N the number of small blocks in one frame. In the formula 5.3, $Q_H$ is the quantization value in the selected domain, and $\alpha_Q$ is the demand quality-of-image parameter. In the formula 5.4, Bitrate is the necessary bit rate, $P_L$ and $P_H$ the predicted bit amounts of the outside and the inside of the selected domain, calculated by the formula 4.6 and 4.7 respectively, and fps is the frame rate.

$$Q_L = f\left(\frac{B_i}{N}\right) \tag{5.2}$$

$$Q_H = \frac{Q_L}{\alpha_Q} \tag{5.3}$$

$$\text{Bitrate} = (p_L + P_1) * fps \tag{5.4}$$

The bit rate calculation section (1330) outputs the necessary bit rate computed according to the formula 5.4 to the necessary bit rate output section (1350).

Although the case where the demand quality-of-image input section (1340) computes the demand quality-of-image parameters using the quantization value and the necessary bit rate calculation section (1330) computes the necessary bit rate for coding the image using the demand quality-of-image parameters is explained above, it is also possible for the demand quality-of-image parameters not to be limited to the quantization value, and we can specify it by the frame rate or those combinations.

Thus, since the image coding equipment in this mode for carrying out the present invention is equipped with the demand quality-of-image input section with which a user can specify demand quality of image of the selected domain and the necessary bit rate calculation section that commutes the necessary bit rate for attaining the demanded quality of image, the user can know the necessary bit rate to improve the image quality of the selected domain, can grasp the relation between the coding quality of image and the necessary bit rate, and can perform bit rate allocation efficiently after considering the quality of each image when one transmission way is shared by plural of images.

Moreover, although the sum total of the bit rates of the inside and the outside of the selected domain is computed in the formula 5.4, by computing $P_L$*fps and $P_H$*fps separately it is possible to compute and output the necessary bit rate for coding the inside of the selected domain and that for coding the outside of the selected domain separately.

The Sixth Mode for Carrying out the Present Invention

Figure 15:
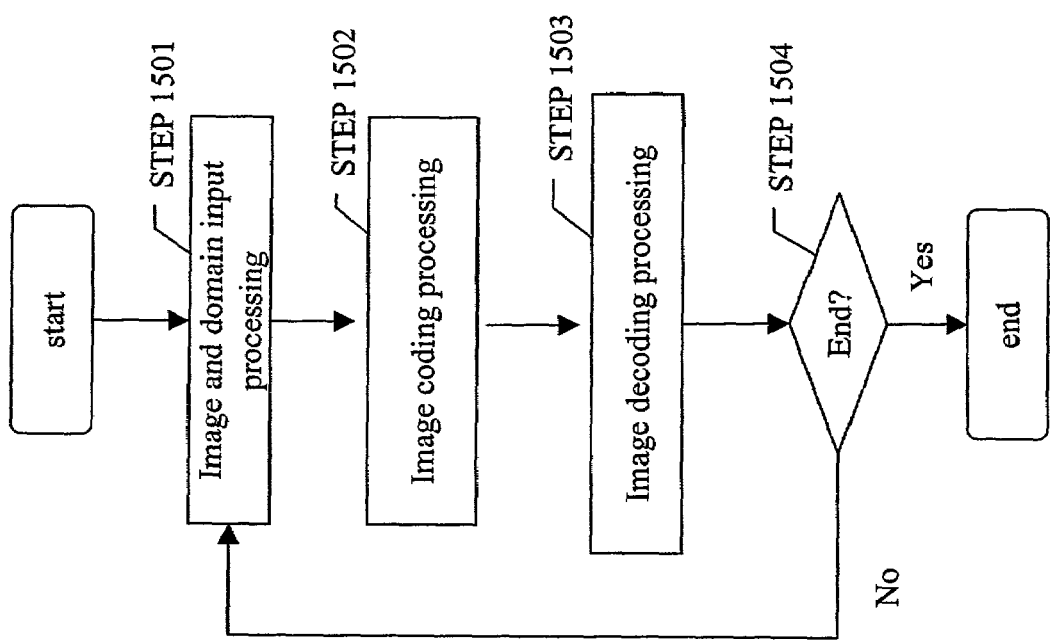
FIG. 15 illustrates a flow chart that shows the basic operation of an image coding program.

FIG. 15 is a flow chart that shows the basic operations of the image coding program of this invention. In STEP1501, which is an image and domain input processing, the image to be coded and the specification of the domain in the image are received. The image to be coded is received as the signals of a collection of still pictures transformed into the digital signals. A domain selection step is performed in this STEP1501. A domain selection step is a step in which the specification of arbitrary domains in an image are received.

The word 'arbitrary' means that the user who operates this image coding program can select domains in the image based on his/her preference or his/her need. As the specification of the domain in an image, it is considered that this image coding program receives at STEP1503 the form of data of a matrix containing 0s and 1s whose minimum unit is the block. The portion of 1s in this matrix specifies the domain. In addition, such a matrix will be called the selection domain map and the domain that consists of blocks containing 1 will be called the selected domain.

In STEP1502, which is the image coding processing, the image received by STEP1501 is coded. To code the image, the difference of the current picture and the picture which is obtained by decoding the previous coded picture and which is stored in the memory is calculated, the DCT (the Discrete Cosine Transformation) is applied to the difference, the result of DCT is quantized, the result of quantization output by coding the quantized result. In addition, before taking the difference, filter operations may be performed to the input image.

The quantization is an operation of asking by how many times larger is a coefficient obtained by DCT than the predetermined quantization value. Therefore the portion smaller than the quantization value is omitted.

Moreover, in case the result of coding is output, the result of coding is accumulated and it is made to be output to a buffer called a virtual buffer so that the result of coding is output at a fixed rate per fixed time.

In STEP1503, the decoding processing is performed from the result of the coding obtained at STEP1502, and the result of decoding is stored into the memory as a picture used to take the difference at STEP1502.

In STEP1504, it is judged whether to continue the coding of an image and if the next step should be continued; the next step is STEP1501.

As parameters for coding the image at STEP1502, it is possible to enumerate the quantization values of blocks of image to be coded, the frame rates, the characteristic values of filters, the threshold values to skip the frames according to the remainder of the virtual buffer and it is possible to change these parameter values over the blocks of the image to be coded. Then, these parameters are changed in the inside and outside of the selected domain input at the domain selection step, and the quality of image of the selected domain can be improved over that of the outside of the selected domain. Thus, by changing the parameters, the domain whose quality of image in a picture is to be improved, can be selected.

Moreover, it becomes possible to improve the quality of image of a specific object by recognizing the object in a picture automatically and making it into the above-mentioned selected domain, the domain in which the specific object appears.

The Seventh Mode for Carrying out the Present Invention

The image coding program in the seventh mode executes as the STEP1502 of the step for processing the coding image. The gradual coding parameter calculation step in which the gradually changing coding parameters gradually change in the selected domain and maximize the bit amount necessary to code the image and code the image according to the calculated parameters.

A selected domain is a domain in the picture that consists of blocks of 1 in the matrix consisting 0s and 1s as in the sixth mode for carrying out the present invention. Moreover, the phrase 'gradually changing' means that the image coding parameter values of adjacent blocks do not change largely.

FIG. 4 is a flow chart explaining the gradual coding parameter calculation step, and consists of the domain division step STEP401, the allocated bit amount calculation step STEP402, the residual bit amount calculation step STEP403, and the end judgment step STEP404.

The Domain Division Step STEP401

In this step, the division of the selected domain is performed. As one method of the division, the selected domain is divided from the outside to the inside into areas. That is, first, the center of gravity of the selected domain is set to G, and the j-th small block in the selected domain is set to Block(j). Let Vj be the cross point of the half-straight line extended from G to the center of Block(j) and the boundary of the selected domain (when there are two or more crossing points, the nearest point to G is chosen).

Let $\beta$ be the maximum number of division operations on the selected domain, N be the number of times where STEP401 in the loop from STEP401 to STEP404 is performed If the areas obtained is called the 1st, the 2nd, the 3rd, . . . , Nth areas, Block (j) is defined to belong to the I-th area when a line segment GVj is divided into the $\beta$ sections of the equal length and the center of Block(j) belongs to the I-th segment from the point Vj. If the center of Block (j) is on the boundary point of the sections, let the center of Block(j) belong to the section near the point Vj. Below, the I-th area is denoted as areaI.

The Allocated Bit Amount Calculation Step STEP402

In the allocated bit amount calculation step, the allocation of bit amounts to the result of coding the image in the blocks of the inside of the selected domain and the result of coding the image in the blocks of the outside of the selected domain is performed and the bit amount of each area obtained at the domain division step STEP401 is calculated. For the allocation of the bit amount to the blocks inside and outside of the selected domain the code allocation magnification $\alpha$ is determined beforehand and the bit amount is allocated using the formulae 1.1 and 1.2. $A_H$ and $A_L$ are the bit amounts allocated to the inside and outside respectively of the selected domain, Bi is the allocated bit amount to the picture i, N is the number of blocks in one frame, and $N_H$ and $N_L$ is the numbers of blocks in the inside and outside respectively of the selected domain.

Next, the bit amount is allocated to the block belonging to each area in the selected domain. For this allocation, it is assumed that the ratio $\gamma$ of the bit amounts allocated to adjacent areas is determined. By using $\gamma$, $\Delta B$ of the difference of bit amount allocated to blocks of the adjacent areas, calculated by the formula 1.5, is calculated. $A_L$ is the bit amount allocated to the blocks outside the selected domain. And the bit amount of marks allocated to the blocks belonging to area-i is calculated by the formula 1.6.

The Residual Bit Amount Calculation Step STEP403

At the residual bit amount calculation step, the bit amount allocated to the selected domain calculated at the allocated bit amount calculation step STEP402 and the bit amount allocated to a block belonging to the each area are calculated and the difference of them is taken. That is, the difference RHi is taken by the formula 1.7, where $A_{Hi}$ is the bit amount allocated to blocks belonging to area-i, and $N_{Hi}$ is the number of blocks belonging to the area-i.

The End Judgment Step STEP404

In the end judgment step, it is judged whether the gradual coding parameter calculation step is ended by seeing whether the formula 1.8 holds by using RHi calculated the residual bit amount calculation step, STEP403. If the formula 1.8 holds, the residual coding amount calculation step will be ended; otherwise, the next step to be executed is the domain division step, STEP401.

The bit amounts allocated to all blocks that constitute an image are calculated by STEP401 to STEP404. From these bit amounts, the quantization value for every block is calculated according to the formula 1.9. Or the frame rate is calculated by the formula 2.2. Or by getting the characteristic value of a filter according to the formula 3.1, or by setting up the threshold value of the remainder of the virtual buffer, the coding parameters for each block are calculated and the coding is done so that the quality of image around the center of the selected domain improves without generating sense of incongruity.

The Eighth Mode for Carrying out the Present Invention

In the eighth mode for carrying out the present invention, an image coding program changes the coding parameters of the image of the inside and the outside of the selected domain by performing a priority input step and a coding parameter calculation step.

A priority input step is a step in which a user can specify the priorities among the parameters for coding images. For example, a picture in which two or more parameter names are shown to the user and the priorities among the parameters are determined according to the input of the user.

A coding parameter calculation step changes the coding parameters of the image in the selected domain according to the priorities determined at the priority input step. FIG. 12 is a flow chart of the flow of processing in a case in which there are three parameters, and the initial value of the values of the parameters is calculated in STEP1201. In STEP1202, the value of the parameter at the lowest place in the priority is changed. In STEP1203 the judgment whether the parameter at the second place in the priority can be changed or not is executed, and if it can be changed, the next step to be executed is STEP1204, otherwise, the processing terminates. In STEP1204, the parameter at the second place in the priority is changed. In STEP1205 the judgment whether the parameter at the first place in the priority can be changed or not is executed. If it can be changed, the next step to be executed is STEP1206, otherwise, the processing terminates. In STEP1206, the parameter at the first place in the priority is changed.

Below, a case in which the parameter at the first place in the priority is the size of the selected domain, the parameter in the second place is the quantization value, and the parameter at the third place is the frame rate is explained.

STEP1201 Initial Value Processing of Coding Parameters

In STEP1201, the initial values of the coding parameters of the selected domain inside and outside are set up using the bit amount Bi allocated to the picture i and the selection domain map.

The calculation method of the initial coding parameters is shown in the formula 4.4 from the formula 4.1, which are shown above. In the formula 4.1, $Q_L$ is the quantization value of the outside of the selected domain, f(x) a function calculating the quantization values as the formula 1.9 does, Bi the bit amount allocated to the frame i, $a_{bit}$ a coefficient smaller than 1 to reduce the bit amount to be allocated to the outside of the selected domain, and N the number of small blocks in one frame. In the formula 4.2, $Q_{init}$ is the initial quantization value of the block inside the selected domain, and aq is a coefficient for making the quantization value of the selected domain smaller than the other domains and for improving the quality of image in the selected domain. In the formula 4.3, $fps_L$ is the frame rate outside the selected domain, and g(x) is a function calculating frame rates as done by the formula 2.2. In the formula 4.4, $fps^{init}$ is the initial frame rate in the selected domain, and $a_{fps}$ is a coefficient for making the frame rate in the selected domain larger than the other domains.

STEP1202: Change of the Coding Parameter of the 3rd Place in the Priority

In STEP1202, updating processing is performed to the frame rate of the selected domain so that the transmission bit rate may be filled. The method of updating processing is shown in the above formula 4.5.

In the formula 4.5, $fps_H$ is the frame rate after the update processing, $fps_{init}$ the initial frame rate, afps is the coefficient related to the frame rate showing in the formula 4.4, and j is the number of times of updating processing. In the formula 4.6, $P_L$ is the predicted bit amount of the outside of the selected domain, $g^{-1}$ is the inverse function of the formula 2.2, which is the function that computes the predicted bit amount of a small block from a quantization value and a frame rate, and $Q_L$ is the quantization value outside the selected domain, $fps_L$ is the frame rate outside the selected domain, and $N_L$ the number of small blocks outside the selected domain. In the formula 4.7, $P_H$ is the bit amount generated inside the selected domain, $Q_H$ the quantization value outside the selected domain, and $N_H$ is the number of small blocks in the selected domain. In the formula 4.9, $P_i$ is the predicted bit amount of the whole frame i.

And the formulae 4.9 and 4.10 show the condition for terminating the processing. If one of the formulae 4.9 or 4.10 becomes true, this step is terminated. Otherwise the value of j is increased and the frame rate is updated according to the formula 4.5 until one of the formulae 4.9 or 4.10 becomes true.

STEP1203: End Judging Processing

In this processing, the end judging of calculation processing of the coding parameters is performed. For the end judging, the formula 4.9 is used. If the formula 4.9 is true, the processing is terminated. That is, if the predicted bit amount is within the allocated bit amount, the processing is terminated. On the other hand, when the formula 4.9 is false, the next step to be executed is STEP1204.

STEP1204: Renewal of the Parameter of the Second Place in the Priority

In STEP1204, the coding parameter whose priority is the second place is updated, and the bit amount of marks is refrained from becoming large so that the transmission bit rate may be filled.

Since the coding parameter of the second place in the priority is the quantization value, the updating method of the quantization value is shown in the formulae 4.11 and 4.12. In the formula 4.11, $Q_H$ is the quantization value after updating, $Q_{init}$ is the initial quantization value, aq is the coefficient relating to quantization value in the formula 4.2, and j is the number of times of the update processing at STEP1204. Namely, the formula 4.11 is calculated by increasing the value of j until the formulae 4.9 or 4.12 become true.

STEP1205: End Judging Processing

In STEP1205, the end judgment is performed after the parameter of the second place in the priority is changed The formula 4.9 is used for the end judgment, and if it becomes true, the processing is terminated, otherwise, the next step to be executed is STEP1206 so that the parameter of the first place in the priority is changed.

STEP1206: Renewal of the Parameter of the First Place in the Priority

In STEP1206, the coding parameter whose priority is the first place is updated, and the bit amount of marks is refrained from increasing so that the transmission bit rate may be filled. In the current case, since the parameter of the first place in the priority is the size of the selected domain, the size is updated so that it becomes smaller.

In the formula 4.13, Block (k) is the small block k, $Area_H$ is the inside of the selected domain, dk is the distance from the center of gravity of the selected domain to the small block k, $a_{Area}$ is the coefficient for updating the size of the selected domain, j represents the number of times of the repetition of this processing, and D is the distance to the furthest small block from the center of gravity of the initial selected domain. In the formula 4.14, $Area_L$ is the outside of the selected domain. In the formulae 4.13 and 4.14, x□y means that x is contained in y.

The selected domain is made smaller in this way until the formula 4.9 becomes true, after calculating the necessary bit amount by the formula 4.8.

Thus, since, as for the end judging processing, the judgment is performed by whether the formula 4.9 relating the bit amount holds, the priority of the parameters is not restricted to what was described above.

In this mode for carrying out the present invention, a user specifies the priority of the coding parameters of the selected domain whose image quality should be improved and the image coding program changes the values from the coding parameter lower in the priority so that the bit amount satisfies the bit rate. Therefore, the image quality relating to the high priority parameters can be improved.

The Ninth Mode for Carrying out the Present Invention

In the ninth mode for carrying out the present invention, the image coding program executes a demand quality-of-image input step in which a user specifies the demand quality of image of the selected domain whose image quality the user wants to improve, and a required bit rate calculation step in which the necessary transmission bit rate for coding an image in the specified demand quality is computed.

In a demand quality-of-image input step, an image coding program, for example, displays to the user a screen into which the user inputs the difference of the parameters for coding a picture inside and outside the selected area and reads the input values. For example, the user inputs the ratio of the quantization values for coding a picture inside and outside the selected domain. Let $\alpha_Q$ be the ratio of this quantization value. The quantization value QH in the selected domain and the quantization value $Q_L$ outside of the selected area in the relation shown in a formula 5.1.

Then, in the required bit rate calculation step, $Q_L$ is calculated using the formula 5.2, $Q_H$ is calculated using the formula 5.3 with the value of a quantization values, the bit amount is calculated according to the formula 4.6 and the formula 4.7, and bit rate is calculated and output using the formula 5.4 with the frame rate fps out being used.

Although the bit rate is calculated from the ratio of the quantization values in this explanation, when the quantization values are decided, it is clear that the bit rate can be calculated from the ratio of the frame rates.

Thus, in this mode for carrying out the present invention, by executing the demand quality-of-image input step in which a user specifies the demand quality of image of the selected domain and the necessary bit rate calculation step in which the necessary bit rate to attain the image quality is calculated, the image coding program can show the user the necessary bit rate to improve the image quality of the selected domain. Therefore, the user can grasp the relationship between the coded image quality and the transmission bit rate and can efficiently allocate bit rates to each image when one transmission way is shared by several images.

Moreover, although the sum total of the bit rates of the inside and the outside of the selected domain is calculated by the formula 5.4, it is possible by calculating $P_L$*fps and $P_H$*fps separately to calculate and to output the bit rates for coding and transmitting the inside and the outside of the selected domain.

Effect of the Invention

As mentioned above, the image coding equipment which codes picture signals, in the 1st invention, has the domain selection section which a user can select and require the domain whose quality of image the user wants to improve, and is characterized by the ability to change the coding parameters of the selected domain. Thereby, the user can select domains whose quality of image the user wants to improve in a picture.

In the second invention, it becomes unnecessary for the user to manually select domains. Coding equipment with the domain automatic selection section automatically recognizes the domains whose quality of image should be improved and selects the domains.

In the 3rd invention, it is characterized by having the gradual coding parameter calculation section that computes the coding parameters such that they change gradually from the center of the selected domains to the boundaries. Since the quality of image can be gradually changed from the inside of the selected domains to the boundaries by coding a picture using the gradually changing parameters calculated, the quality of image in the selected domains can be high, and does not have sense of incongruity on the entire picture, a natural image can be offered.

In the 4th invention, the gradual coding parameter calculation section is characterized by computing the quantization values gradually changing from the center of the selected domains to the boundaries. Since the values of quantization errors can be gradually changed in the direction of the selected domain boundaries from the inside of the selected domains by coding the selected domains using gradual quantization values, the image quality of the center of the selected domains can be kept high without producing big block noises on the selected domain boundaries, there is no sense of incongruity on the entire picture, and a natural image can be offered In the 5th invention, the gradual coding parameter calculation section is characterized by computing the frame rates gradually changing from the center of the selected domains to the direction of the selected domain boundaries.

Since the value of frame rates can be gradually changed in the direction of the selected domain boundaries from the inside of the selected domain, by coding the selected domain using the gradually changing frame rates, there is no sense of incongruity on the entire picture with higher frame rates near the center of the selected domain, without producing differences of big frame rates on the selected domain boundaries, and it can offer a natural image.

In the sixth invention, the gradual coding parameter calculation section is characterized by computing the characteristic values of pre-filters gradually changing from the center of the selected domains to the direction of the selected domain boundaries. By coding the selected domains using the gradual pre-filter, the frequency characteristic of an image can change gradually from the inside of the selected domains to the selected domain boundaries, the center of the selected domains become more vivid without producing large differences of the frequency characteristics on the entire picture, there is no sense of incongruity on the entire picture and a natural image can be offered.

In the seventh invention, the gradual coding parameter calculation section is characterized by computing the frame skipping threshold values gradually changing from the center of the selected domain to the direction of the selected domain boundaries. By coding the selected domains using the gradual threshold values for skipping frames, the number of frames skipped by the threshold values can gradually change from the inside of the selected domains to the selected domain boundaries. The smaller frames are skipped near the center of the selected domains without producing large differences of the number of frames skipped at the boundaries. There is no sense of incongruity on the entire picture and a natural image can be offered.

The eighth invention is characterized by having the priority input section to which a user can specify the priorities of coding parameters and the coding parameter calculation section which changes values from the lower coding parameters of the priorities according to the set-up priority, and performing image coding within the predetermined transmission bit rate. By this it can keep the quality of image high to the high place coding parameters of the priorities that the user set up to the selected domain and improve the quality of image reflecting the intention of the user.

In the ninth invention, it has the demand quality-of-image input section the user can specify demand quality of image of the selected domains and the required bit rate calculation section that computes the necessary transmission bit rate required in order to code the image by the specified demand quality of image, and is characterized by outputting the necessary transmission bit rate. Thereby, a user can grasp the relationship between the transmission bit rates and the quality of coded pictures and can perform the bit rate allocation efficiently when one transmission way is shared by several pictures after considering the image quality of each picture.

Moreover, this invention is set to the image coding program which codes a picture signal that executes the domain selection step in which the selected domain in a picture is input from the user and the coding parameter change step which changes the coding parameters of the selected domain into different values from coding parameters outside of the selected domain and is characterized by the ability to change the coding parameters of the selected domain. Thereby the user can select a domain whose image quality the user wants to improve. Since it is characterized by the ability to change a coding parameter to a selected domain, it is possible for a user to select the domain whose quality of image in a picture the user wants to improve.

Second, it is characterized by performing the gradual coding parameter calculation step that computes the coding parameters gradually changing from the center of the selected domain toward the direction of the selected domain boundaries. Since the quality of image can be gradually changed from the inside of the selected domain to the selected domain boundaries by coding the selected domain using the gradually changing parameters calculated, the quality of image in the selected domain can be high without producing the sense of incongruity on the entire picture, a natural image can be offered.

Third, it is characterized by performing the priority input step in which the priorities of coding parameters inside the selected domain from a user are input and the coding parameter calculation step that change the coding parameters from the lower places of the input priorities and by coding the image within the predetermined transmission bit rate. Thereby, it codes the image based on the parameters calculated according to the priorities the user specifies to the selected domain and the improvement of the image quality is attained with reflecting the intention of the user.

Fourth, it is characterized by performing the demand quality-of-image input step in which the demand quality of the selected domain from the user is input and the necessary bit rate calculation step in which the necessary transmission bit rate for coding the image at the specified quality is calculated and by outputting the necessary transmission bit rate. Thereby, the user can grasp the relationship between the necessary transmission bit rates and the coded image quality and can allocate efficiently the bit rates after considering the coded image quality of each picture when one transmission way is shared by several pictures.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. An image coding equipment, comprising an automatic domain selection section, which automatically recognizes and selects certain domains in a picture for improvement of the image quality therein, wherein said automatic domain selection section comprises a color signal detecting means, which detects the color signals representing the colors of the picture; a color signal judgment means, which judges as to whether the color signals detected by said color signal detecting means correspond to predetermined color signals; and a selection means, which selects the parts of the picture corresponding to said color signals as said domains for improvement of the image quality therein if the judgment result of the color signal judgment means is to the effect that the detected color signals correspond to predetermined color signals, and wherein the values of coding parameters of the domains selected by said automatic domain selection section are changed into values of parameters of the domains not so selected.

2. An image coding equipment, comprising an automatic domain selection section, which automatically recognizes and selects certain domains for improvement of the image quality therein, wherein the values of coding parameters of the domains selected by said automatic domain selection section are changed into values of parameters of the domains not so selected; and wherein said automatic domain selection section comprises a motion value detection means, which detects motion values indicating the amounts of picture motions; a motion value judgment means, which judges as to whether the motion values detected by said motion value detection means are equal to or larger than the predetermined values; and a selection means, which selects the parts of the picture corresponding to said motion values as said domains for improvement of the image quality therein if the judgment result of the motion value judgment means is to the effect that the motion values are equal to or larger than the predetermined values.

3. An image coding equipment according to any one of claims 1 to 2, comprising a gradual coding parameter calculation section that automatically calculates coding parameters change gradually in said selected domains for maximizing the bit amount required to code the picture within the upper limit of a predetermined bit amount.

4. An image coding equipment according to claim 3, wherein the values of coding parameters changed in said selected domains are frame rates.

5. An image coding equipment according to claim 3, wherein the values of coding parameters changed in said selected domains are characteristic values of pre-filters.

6. An image coding equipment according to claim 3 wherein the values of coding parameters changed in said selected domains are frame skipping threshold values, which are used to make determination as to whether to code or not to code the blocks.

7. An image coding equipment according to any one of claims 1 to 2, wherein the values of coding parameters changed in said selected domains are quantization values.

8. An image coding equipment according to any one of claims 1 to 2, wherein the values of coding parameters changed in said selected domains are frame rates.

9. An image coding equipment according to any one of claims 1 to 2, wherein the values of coding parameters changed in said selected domains are characteristic values of pre-filters.

10. An image coding equipment according to any one of claims 1 to 2, wherein the values of coding parameters changed in said selected domains are frame skipping threshold values, which are used to make determination as to whether to code or not to code the blocks.

11. An image coding equipment comprising a domain selection section that selects arbitrary domains in a picture; and gradual coding parameter calculation section that automatically computes gradually changing coding parameters which change gradually from each center of said selected domains towards a direction of each boundary and maximizes a bit amount required to code the picture within an upper limit of a predetermined bit amount; a priority input section, that sets priorities for changing said coding parameters in said selected domains; and a coding parameter calculation section that changes coding parameter values in the order of siad priorities starting from coding parameters having a low priority; wherein said image coding equipment codes the picture with a predetermined transmission bit rate.

12. Am image coding equipment according to claim 11, wherein said coding parameters correspond to sizes, quantization values, and/or frame rates of the selected domains.

13. An image coding equipment comprising a domain selection section that selects arbitrary domains in a picture; and a gradual coding parameter calculation section that automatically computes gradually changing coding parameters which change gradually from each center of said selected domains towards a direction of each boundary and maximizes a bit amount required to code the picture within an upper limit of a predetermined bit amount; a demand quality-of-image input section that a user can specify image quality of the picture, being coded and transmitted, in accordance with differences in parameters of the domains selected and those domains not selected; and a necessary bit rate calculation section that calculates and outputs the necessary transmission bit rate to code the picture at the specified image quality.

14. An image coding equipment according to claim 13, wherein said necessary bit rate calculation section outputs separately the necessary transmission bit rate to code and transmit the picture of said selection domains, and the necessary transmission bit rate to code and transmit the picture of the domains not selected.

15. An image coding equipment comprising a program embodied on a computer readable medium for execution by a computer, that selects arbitrary domains in a picture, receives priorities for changing values of coding parameters in said selected domains, changes said values of coding parameters in an order of said priorities starting from coding parameters having a low priority, by automatically computing gradually changing coding parameters which change gradually from each center of said selected domains towards a direction of each boundary and maximizes a bit amount required to code the picture within an upper limit of a predetermined bit amount, and carries out coding of the picture within a predetermined transmission bit rate.

16. An image coding equipment a program embodied on a computer readable medium for execution by a computer that selects arbitrary domains in a picture, autoatically computes gradually changing coding parameters which change gradually from each center of said selected domains towards a direction of each boundary and maximizes a bit amount required to code the picture within an upper limit of a predetermined bit amount, receives an image quality of the picture, being coded and transmitted, in accordance with differences in parameters of said selected domains and those domains not selected; computes a transmission bit rate necessary for coding at the specified image quality; and outputs said necessary transmission bit rate.

* * * * *